United States Patent

[11] 3,633,177

[72] Inventor Earl W. Caldwell
Mohawk, N.Y.

[21] Appl. No. 858,068
[22] Filed Sept. 15, 1969
[45] Patented Jan. 4, 1972
[73] Assignee Mohawk Data Sciences Corporation
Herkimer, N.Y.

[54] DATA RECORDER WITH MULTIPLE INPUT TERMINALS
11 Claims, 13 Drawing Figs.

[52] U.S. Cl. .......... 340/172.5
[51] Int. Cl. .......... G06f 15/00
[50] Field of Search .......... 340/152, 172.5, 153; 235/157

[56] References Cited

UNITED STATES PATENTS

| | | | |
|---|---|---|---|
| 3,400,376 | 9/1968 | McDonnell | 340/172.5 |
| 3,133,268 | 5/1964 | Avakian et al. | 340/152 |
| 3,281,789 | 10/1966 | Willcox et al. | 340/152 |
| 3,312,952 | 4/1967 | Scantlin et al. | 340/172.5 |
| 3,314,051 | 4/1967 | Willcox et al. | 340/172.5 |
| 3,344,401 | 9/1967 | MacDonald et al. | 340/172.5 |
| 3,345,612 | 10/1967 | Goldman et al. | 340/172.5 |
| 3,407,387 | 10/1968 | Looschen et al. | 340/152 |

*Primary Examiner*—Gareth D. Shaw
*Assistant Examiner*—Mark Edward Nusbaum
*Attorneys*—Francis J. Thomas, Richard H. Smith, Thomas C. Siekman and Sughrue, Rothwell, Mion, Zinn & Macpeak

ABSTRACT: A key-to-magnetic tape recorder is provided with multiple keyboard units to enable a plurality of operators to simultaneously supply input message blocks to a magnetic tape unit for recordation on a single magnetic tape. Each keyboard unit has a buffer memory for accumulating a single message block. A multiplexer having a transfer memory with a capacity for storing a plurality of message blocks sequentially polls the keyboard terminals and when a terminal having a completed message is encountered, polling is interrupted and the terminal transmits the message to the transfer memory over a common transmitting cable. The tape unit has a single-message block buffer memory and when the unit indicates that it is ready to record the next message block, a block is transferred from the transfer memory to the tape buffer memory. All block sections of the transfer memory share a common set of input lines, a common set of output lines and a single set of accessing circuits. Just prior to the time each polling request is transmitted to the terminals, the multiplexer controls inspect for the presence of at least a single message in the transfer memory and a message demand indication from the tape unit. If both these requirements are present, the polling operation is inhibited and a message is transferred out of the transfer memory. In this way unloading of the transfer memory takes priority over loading and maximum message transfer efficiency is accomplished with minimum hardware. Error control means automatically operate upon detection of certain types of transmission errors to reject the message and to notify the keyboard terminal from which the erroneous message was transmitted. Display means are provided for indicating the terminal origin of each message stored in the transfer memory and the tape unit buffer memory.

INVENTOR
EARL W. CALDWELL
BY, Richard H. Smith
ATTORNEY

DATA RECORDER WITH MULTIPLE INPUT TERMINALS

BACKGROUND OF THE INVENTION

This invention relates to keyboard-entry recorders and more particularly, to the type of key-entry recorders designed for direct generation of a high-speed computer input medium such as, for example, a magnetic tape or a magnetic disk.

Since 1965 it has been a common practice in some applications to prepare computer-readable magnetic tapes by writing data directly on the tape via a keyboard similar to that used with the traditional keypunch machine. The most widely used form of key-to-tape recorder includes a separate tape drive with each keyboard unit. Keyed data is fed first to a buffer memory, which accumulates a message block usually having a length of 80 or 100 characters. After the block has been entered in the buffer memory the tape drive is actuated and the message block is read from the memory and recorded on the tape in a standard format having a predetermined interblock gap and bit density. After a series of message blocks have been recorded on the tape, the tape is removed from the machine and run through a subsequent verification operation wherein the same type of machine, operated in the verification mode rather than record mode, is used by an operator to verify the recorded messages through a rekeying operation which in basic concept is the same as the traditional keypunch verification operation except that the magnetically recorded data rather than punched data is compared against the keyed inputs.

Owing to the high density with which data is recorded on the tapes a single operator cannot fill more than a fraction of a tape reel even when working 8 hours straight. Thus users having a high volume of input data requiring a large number of such recorders usually find it necessary for efficient computer utilization to pool the messages from many recorder output tapes onto a single tape before sending the recorded data for processing through a high-speed, computer-connected tape drive. Greater efficiency and cost savings in data processing operations could be realized by such users if this pooling operation was eliminated.

OBJECTS AND SUMMARY OF THE INVENTION

It is an object of the present invention to provide an improved multiple input terminal key-entry recorder whereby a plurality of keyboard terminals can write data on a single record medium.

Another object is to provide an improved data transfer system for channeling a message from any one of a plurality of message input terminals to a single-message processing station.

Still another object is to provide an improved data transfer system provided with means having the ability to provide an indication of the terminal origin of any message in process within the system.

Yet another object is to provide an improved data transfer system for channeling a message from any one of a plurality of message input terminals to a single-message processing station wherein the rejection of a message by the system due to a message transfer error is automatically brought to the attention of the terminal from which the erroneous message was transmitted without interrupting the operation of the other terminals in the system.

A further object is to provide an improved data transfer system for channeling a message from any one of a plurality of message input terminals to a single-message processing station through the use of simple and relatively inexpensive message multiplexing hardware.

In accordance with the invention, a plurality of keyboard input terminals each having a single-message buffer memory are sequentially polled by a multiplexer having a multiple-message transfer memory and which operates, upon detection of a completed message at a terminal, to initiate the transfer of the completed message to a selected storage section of the transfer memory. Message readout from the transfer memory to the recording device is performed on a first-in-first-out basis on demand of the recording device. Control is such that transfer of messages into the transfer memory and transfer of messages out of the transfer memory is performed on a mutually exclusive basis with priority always assigned to the output operation.

In accordance with another aspect of the invention, error checking means are provided to monitor the accuracy of each message transfer from a terminal to the multiplexer, of each transfer from the multiplexer to the recorder and of each recording operation. A transmitting terminal is blocked from accumulating further input message data during the terminal-to-multiplexer transfer and is released to begin accumulation of a new message after this transfer has been verified by the error checking means. Means are provided to identify the terminal origin of each message during the various transfer operations so that upon detection of a transfer or recording error which results in the rejection of a message the terminal which transmitted the message can be notified to enable subsequent reentry of the message. These means include means operable such that upon detection of an error during the transfer memory-to-recorder transfer operation a special polling cycle is initiated whereby the terminal which transmitted the erroneous message is notified of its rejection without significant interruption of the flow of messages from the other terminals to the recorder.

These and other objects, features and advantages will be made apparent by the following detailed description of a preferred embodiment of the invention, the description being supplemented by drawings as follows:

GENERAL DESCRIPTION

Figure 1:
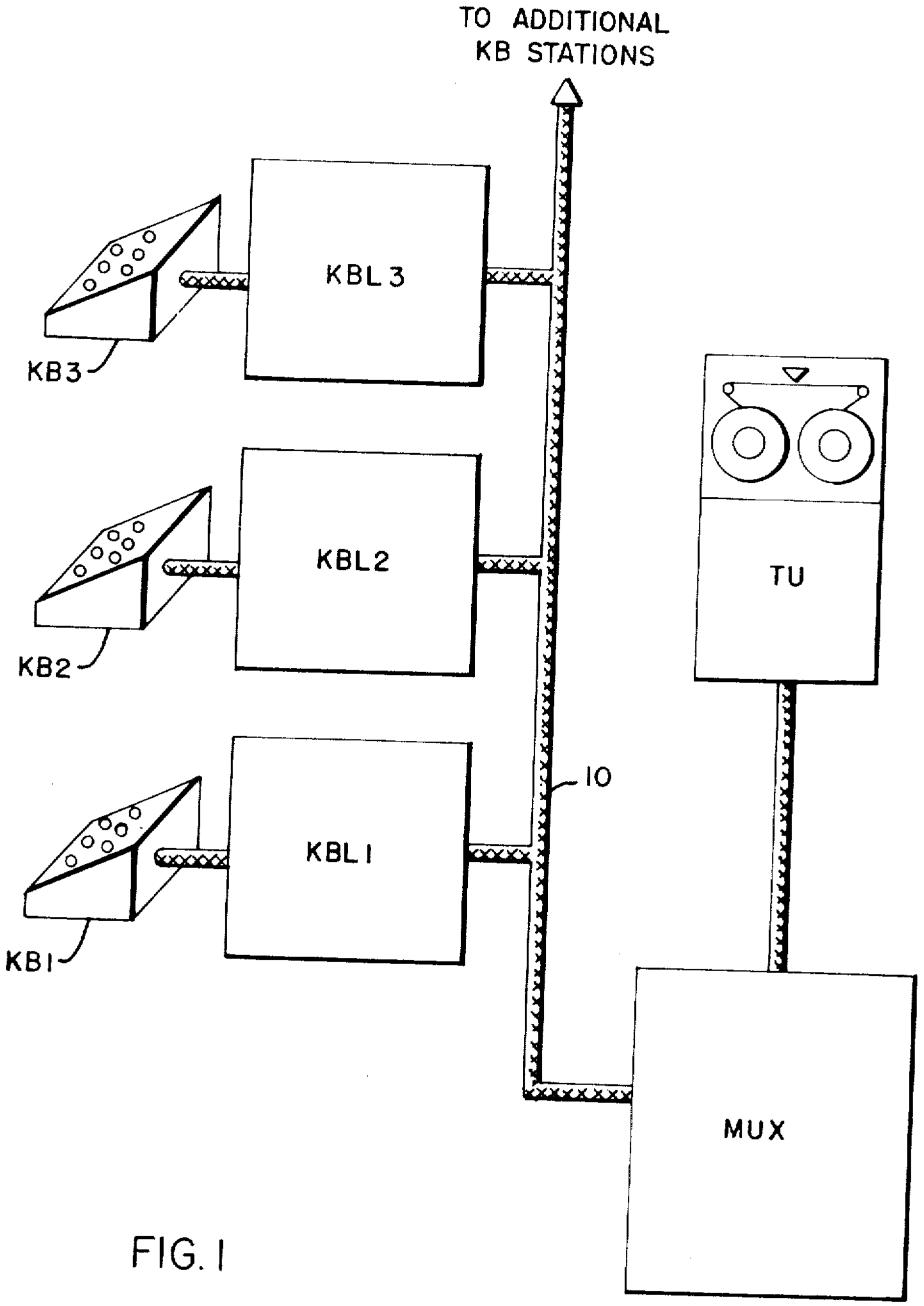
FIG. 1 is a schematic diagram showing the basic components of the data transfer system of the invention.

As shown in FIG. 1, a plurality of keyboard input terminals KB1, KB2, and KB3 are manually operable to supply coded data characters to a buffer memory provided in the associated keyboard logic circuits KBL1, KBL2 and KBL3, respectively. A complete description of the apparatus for loading a message block into the buffer memory from the keyboard and for verifying the data in the memory is set forth in the copending application entitled "Data Recorder With Single Operator Entry-Verify Control," Ser. No. 834,422, filed June 18, 1969 in the name of Earl W. Caldwell. Throughout the present description and subsequent detailed description specific cross-reference is made to this application concerning the details of the keyboard buffer memory loading and readout control circuits.

Each of the keyboard logic units is connected to a multiplexer MUX by a common cable 10. The multiplexer includes a transfer memory having capacity to store a plurality of message blocks sent from the keyboard terminals. Data is written into the transfer memory a block at a time via a set of common input lines and is read out of the memory a block at a time via a common set of output lines. Readout of the message blocks is on a first-in-first-out basis. Because of this simplified handling of message blocks through the transfer memory, only a single set of address circuits, sufficient to serve one memory section, is employed for accessing all memory sections during both the write and readout operations.

When a message block is read out of the transfer memory it is transmitted to a tape unit TU including a single-block buffer memory and a magnetic tape recording device. As soon as a block has been transferred to the tape unit memory a tape recording cycle is initiated wherein the message block is recorded in a standard format on the magnetic tape. The tape drive has a write head for recording the message block, a read head positioned downstream of the tape from the write head by a distance slightly greater than the standard message block length and a selectively operable erase head positioned downstream from the read head. Another erase head which is permanently operable during the time that the tape is being fed in the forward (recording) direction is positioned immediately upstream of the write head for the purpose of clearing the tape of old data prior to the recording operation.

After a message block has been recorded the tape continues moving to scan the recorded block past the read head whereupon a read-after-write data check is performed. During this operation the message block is compared character-by-character with the data still stored in the tape unit buffer memory whereupon the accuracy of the recording operation is verified.

After the read-after-write check has been performed the tape is stopped to await the next recording operation.

The multiplexer supervises transfers to and from the transfer memory on a priority basis that gives precedent to transfers out of the memory. In other words, so long as there is data stored in the transfer memory and the tape unit is in condition to accept data, the multiplexer operates in the transfer memory readout mode to the exclusion of the transfer memory write (input) mode. During this time the multiplexer polling operation, which is the operation used for scanning the keyboard terminals to locate completed message blocks for transfer to the transfer memory, is suspended and any keyboard terminal having a completed message block in its buffer memory must wait. During the waiting period the keyboard terminal cannot accumulate new message data. This waiting period is never more than a few milliseconds if an adequate number of message block sections is provided in the transfer memory. It has been found in one example that five message block sections in the transfer memory are adequate to handle inputs from up to 16 keyboard terminals under peak loading conditions without creating an undue maximum waiting period.

The multiplexer polls the keyboard terminals in a fixed sequence. When a polling request locates a completed message block at a terminal the polling operation is interrupted and an immediate transfer of the message block to the multiplexer is effected. As soon as this transfer has been completed with the message block being stored in the transfer memory the keyboard terminal is released to begin the accumulation of a new message block. After the terminal-to-multiplexer transfer operation polling is resumed with the polling of the next terminal in the sequence. In other words, whenever polling resumes it always picks up at the point in the polling sequence where it had left off after the last polling interruption. Of course, because of the type of transfer memory input-output supervision employed, polling only resumes after a terminal-to-multiplexer transfer if the tape unit is busy (not requesting a new message block).

The system is provided with error control means which monitor the accuracy of the three most critical data transfer operations i.e., the terminal-to-multiplexer transfer, the multiplexer-to-tape unit transfer and the tape unit recording operation. As a part of the error control function, each message block is provided with a terminal identifying code character which accompanies the block during its progress through the system. This is an extremely important feature of the system since if a block is rejected due to the detection of an error it is mandatory that the operator at the keyboard terminal from which the message was transmitted be notified of the rejection so that the rejected message block can be reentered.

During the transfer of a message block from a keyboard terminal to the transfer memory the keyboard terminal is held in the wait status pending verification of the accuracy of the transfer. If an error is detected during the transfer a retransmission of the message block is automatically initiated. If an error is detected during the retransmission the message block is rejected, meaning that in effect it is not stored in the transfer memory, and the keyboard terminal is taken out of the wait status and notified of the rejection by means of an alarm indicator which informs the terminal operator that the just-completed message must be rekeyed.

If an error is detected during the transfer of a message block from the transfer memory to the tape memory a retransmission of the block is initiated. If an error is detected during the retransmission, the block is rejected, meaning that it is not recorded on the tape, and the keyboard terminal at which the message originated receives an error signal which is transmitted thereto through use of the multiplexer polling circuits. The polling address used for this operation is derived from the terminal identifying character accompanying the message block. This error indication, however, is not manifested to the operator until she completes the entry of her current record. As soon as this occurs, an alarm indicator is actuated informing the operator to rekey the message which she entered immediately previous to the message just completed.

If a recording error is detected during the read-after-write check performed by the tape unit, an error alarm at the tape unit is actuated and further transfer of messages out of the transfer memory is blocked. The system is returned to the polling status so that any empty sections in the transfer memory can be filled. As soon as the transfer memory is filled, however, the operation of the system is completely halted until the error condition can be overcome. Since the error was caused by a failure of the recording apparatus it is highly likely that any attempt to go on and record further messages would also generate error alarms. For this reason the total system is shut down until the source of the error can be corrected. Means are provided at the tape unit to display an indication of the terminal origin of the message block that was erroneously recorded. Also, an erase and reset switch is provided to enable a supervising operator to erase the last-recorded, erroneous message from the tape and to restore the system to operation after the fault at the tape unit has been corrected. Display means are also provided at the multiplexer to indicate the terminal origin of each message block stored in the transfer memory.

DETAILED DESCRIPTION

Definition of Circuit Symbols

Figure 2:
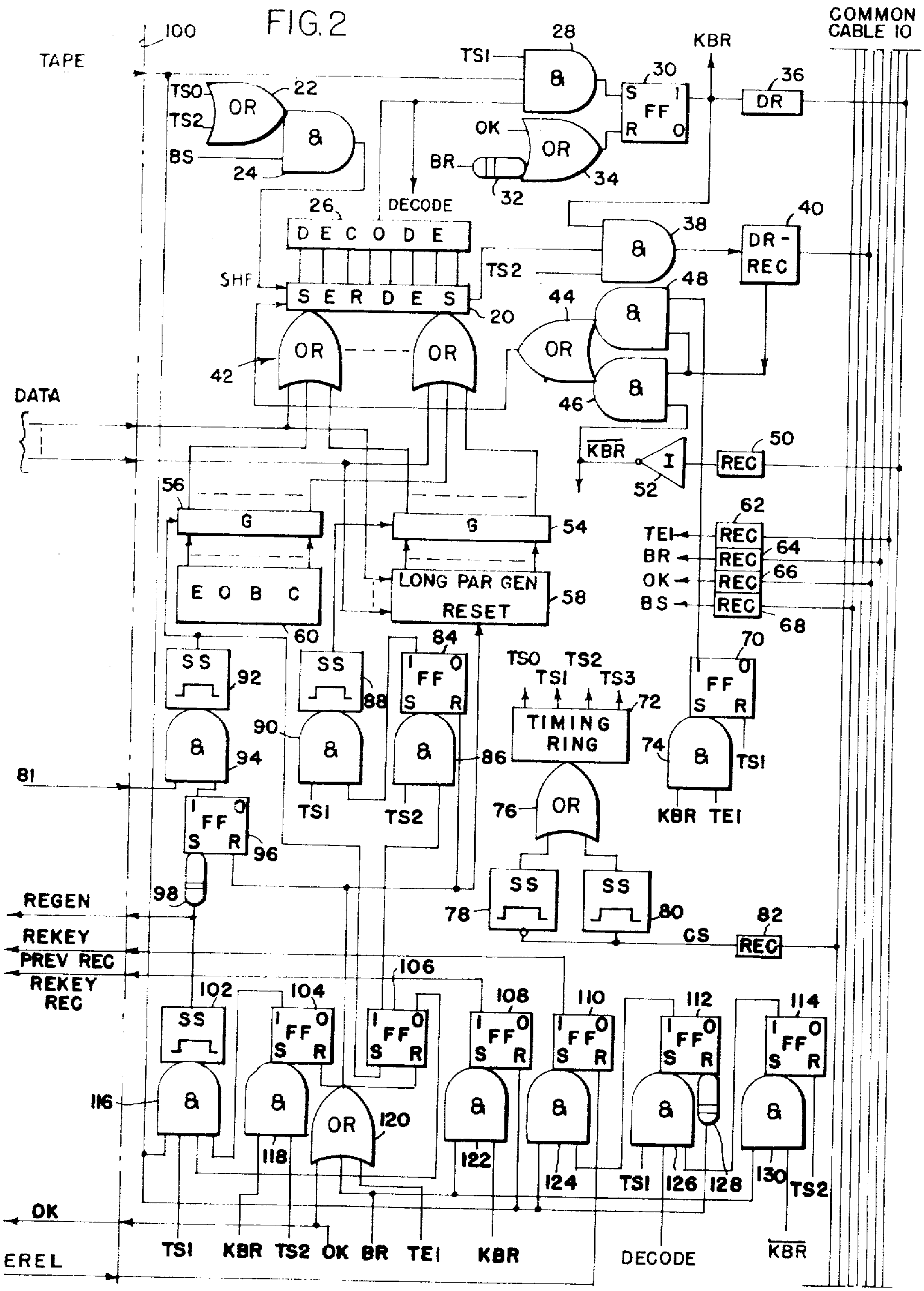
FIG. 2 is a schematic diagram showing a portion of the message transfer control circuitry included at each keyboard terminal.
Figure 3A:
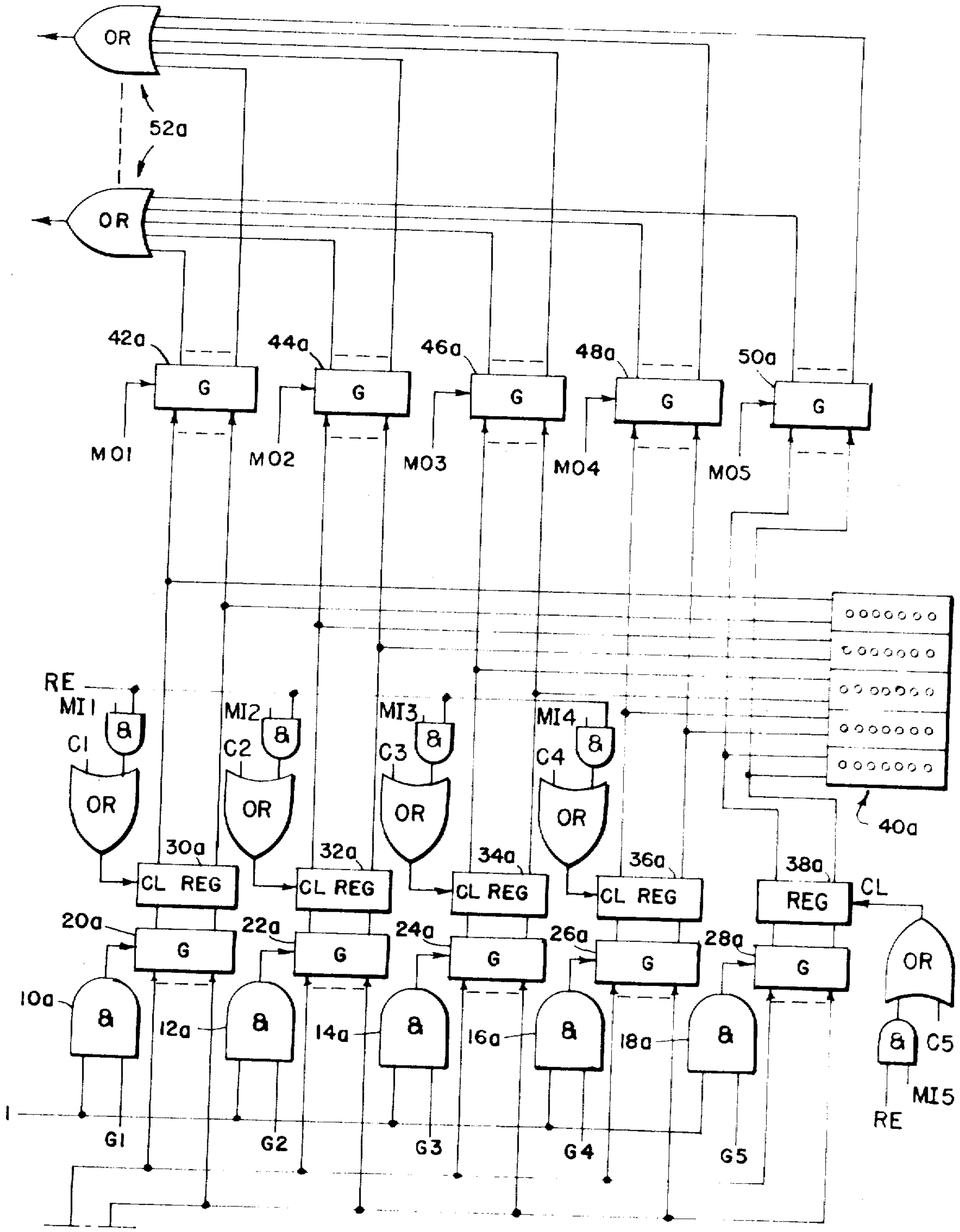
FIGS. 3*a* through 3*i*, when arranged as shown in FIG. 5, constitute a schematic diagram of the logic circuits of the multiplexer and the magnetic tape recording unit, the multiplexer circuits being shown in FIGS. 3*a* through 3*e* and the tape unit circuits being shown in FIGS. 3*f* through 3*i*.
Figure 3B:
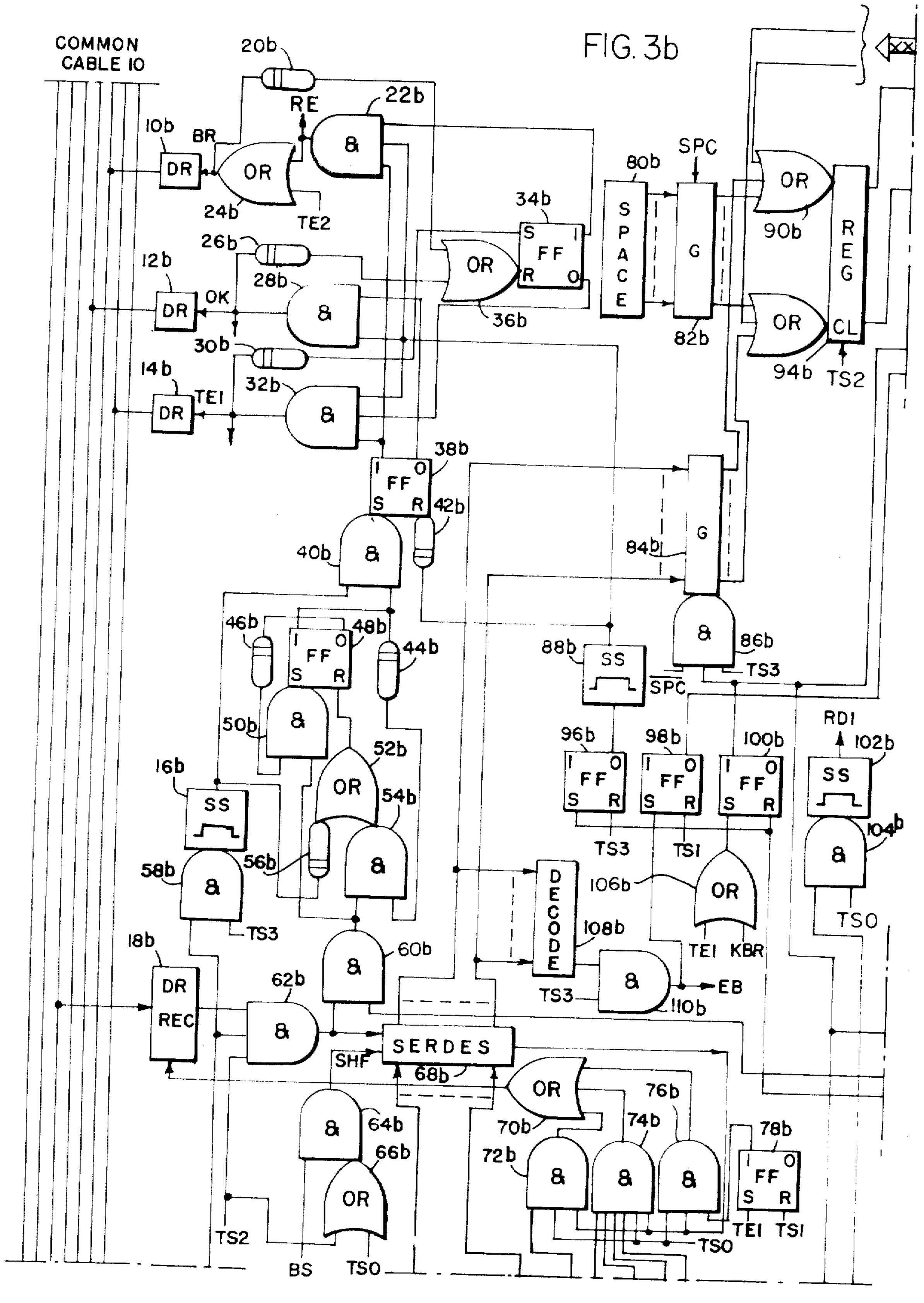
Figure 3C:
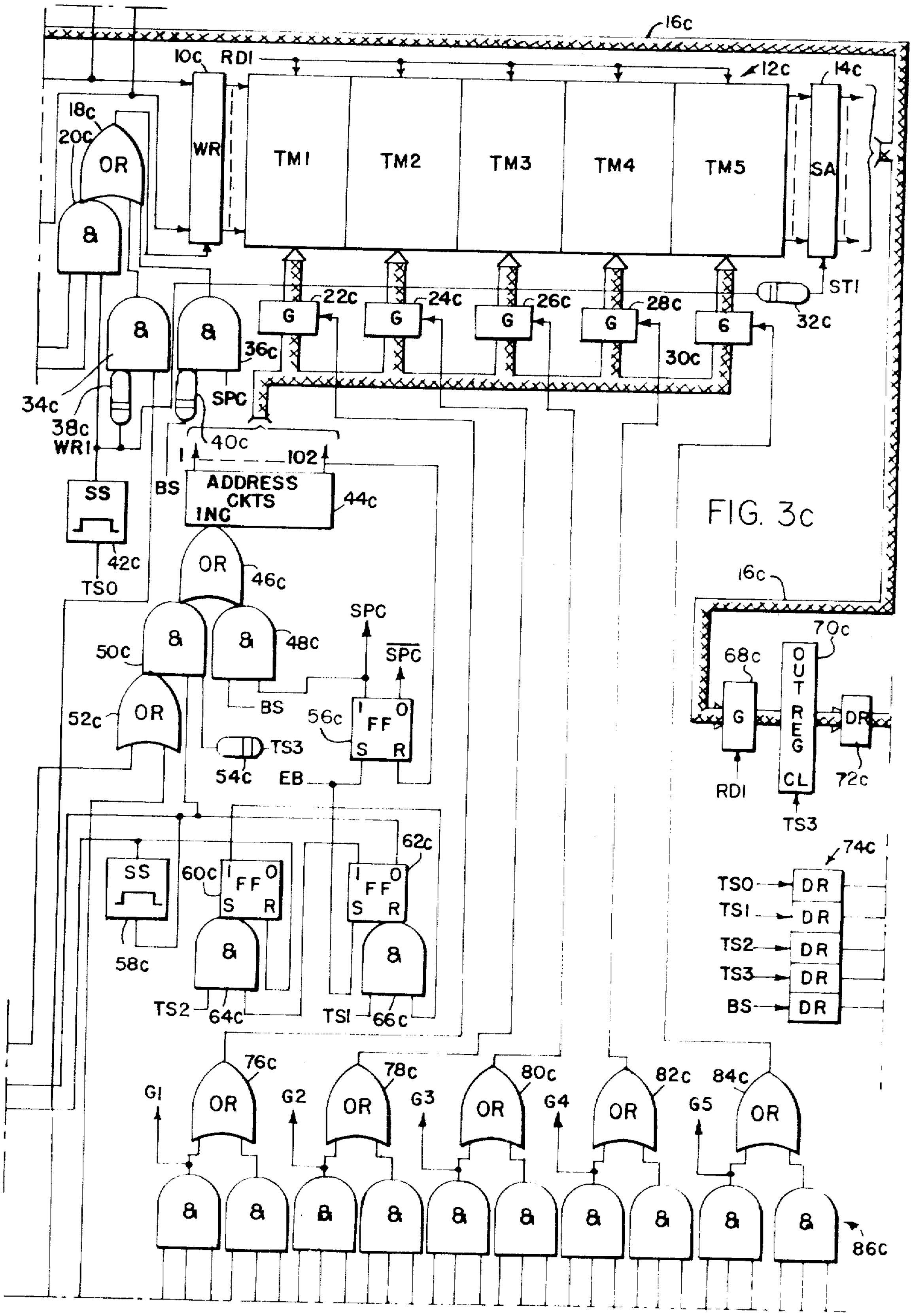
Figure 3D:
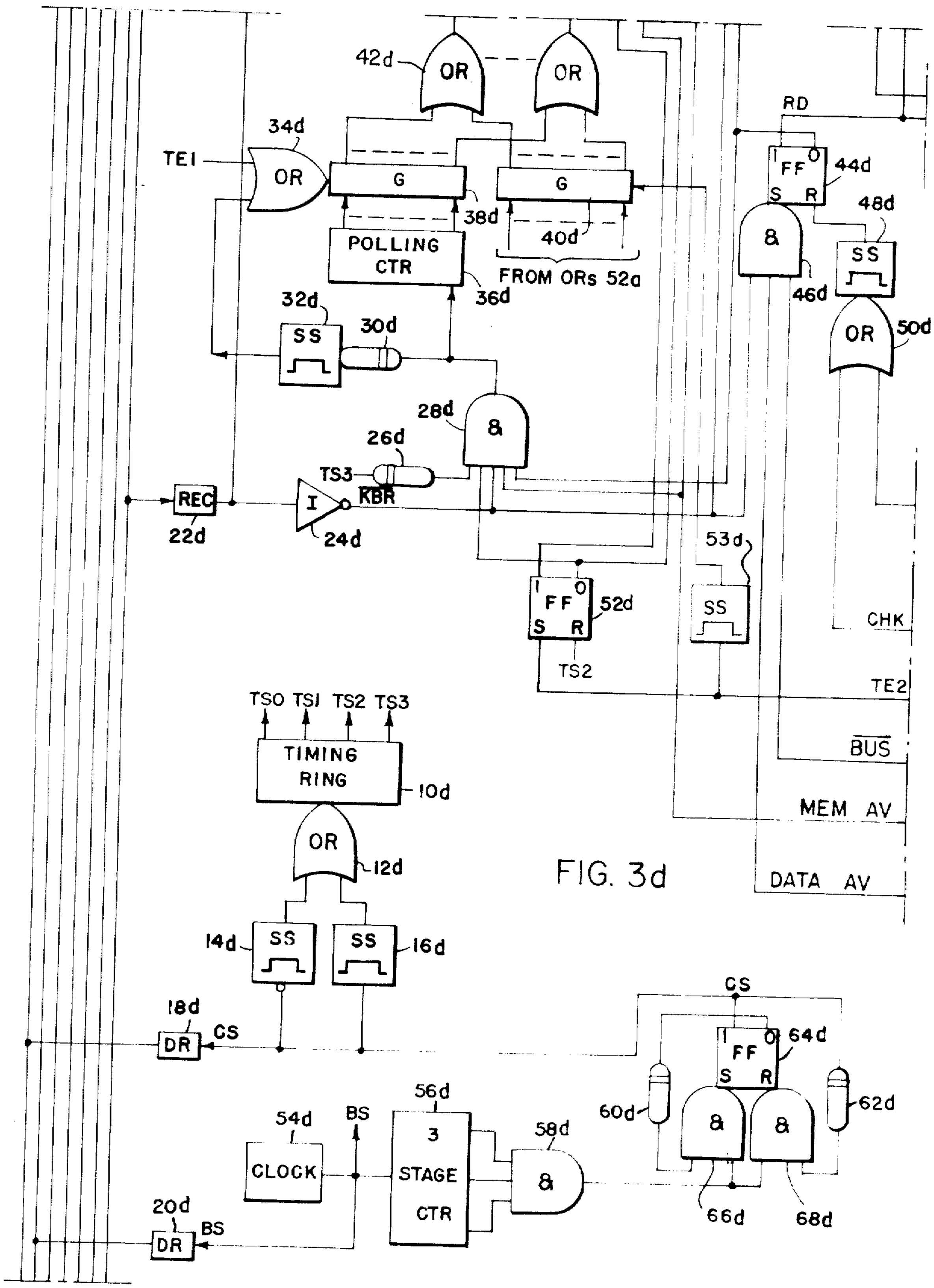
Figure 3E:
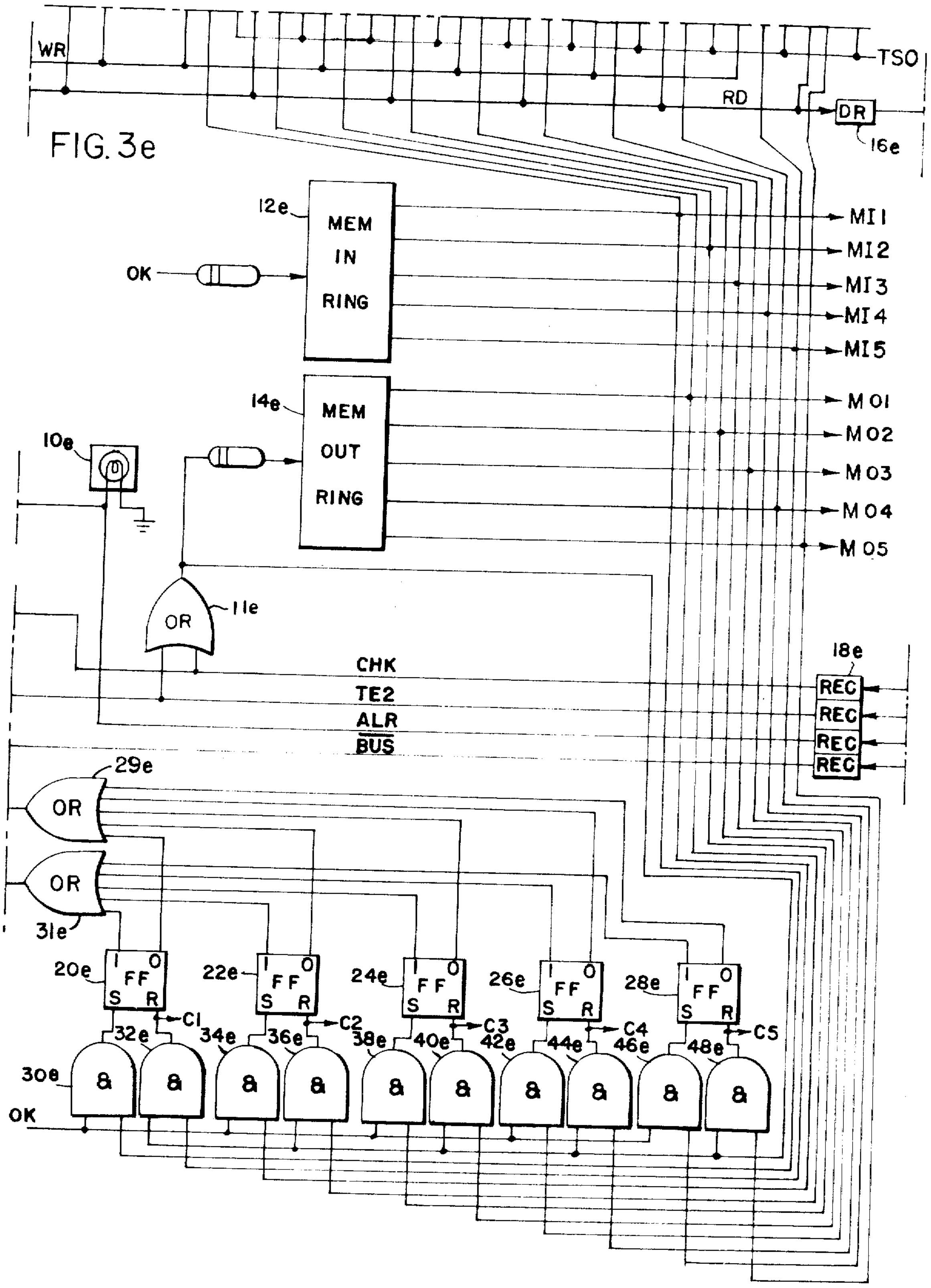
Figure 3F:
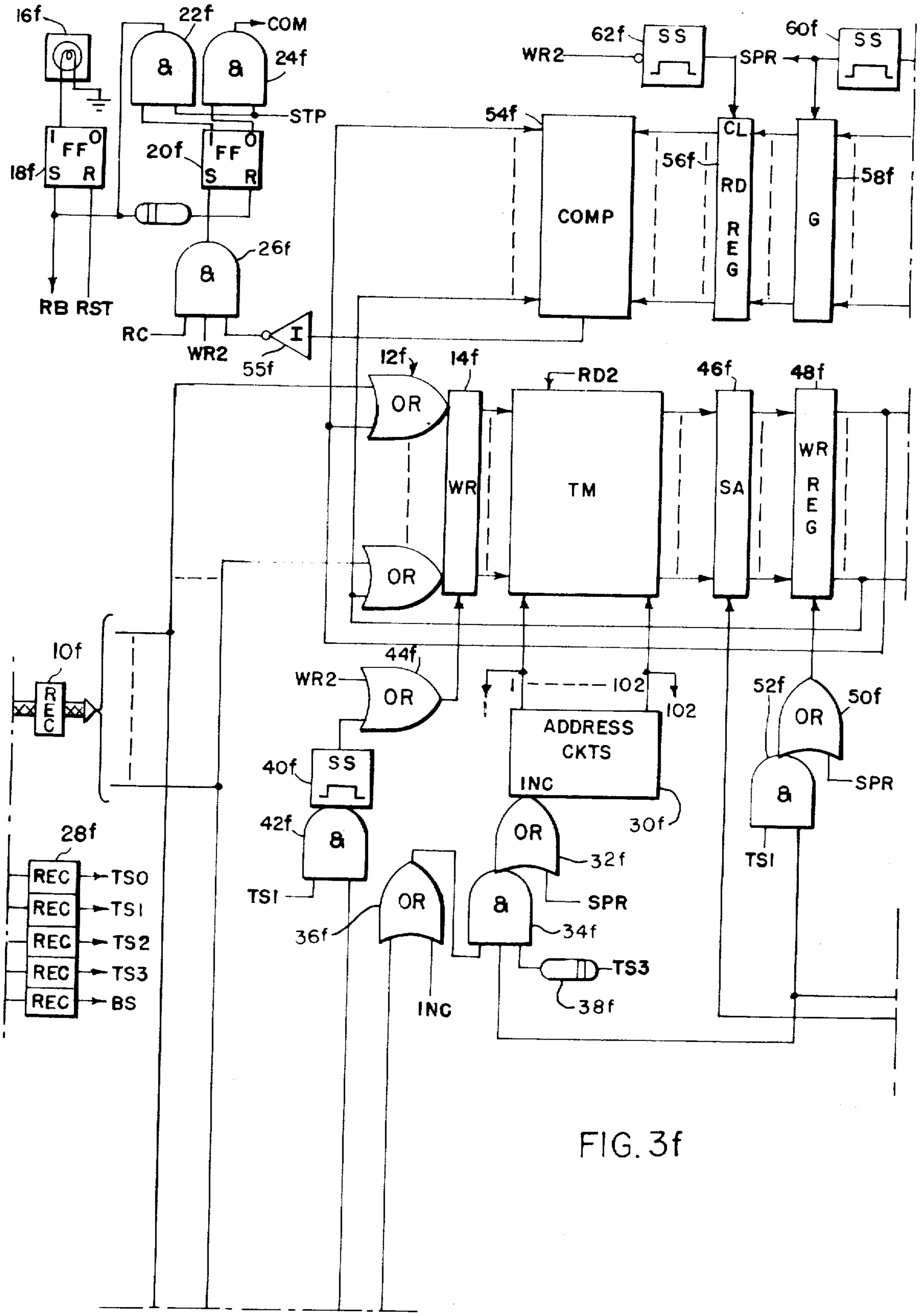
Figure 3G:
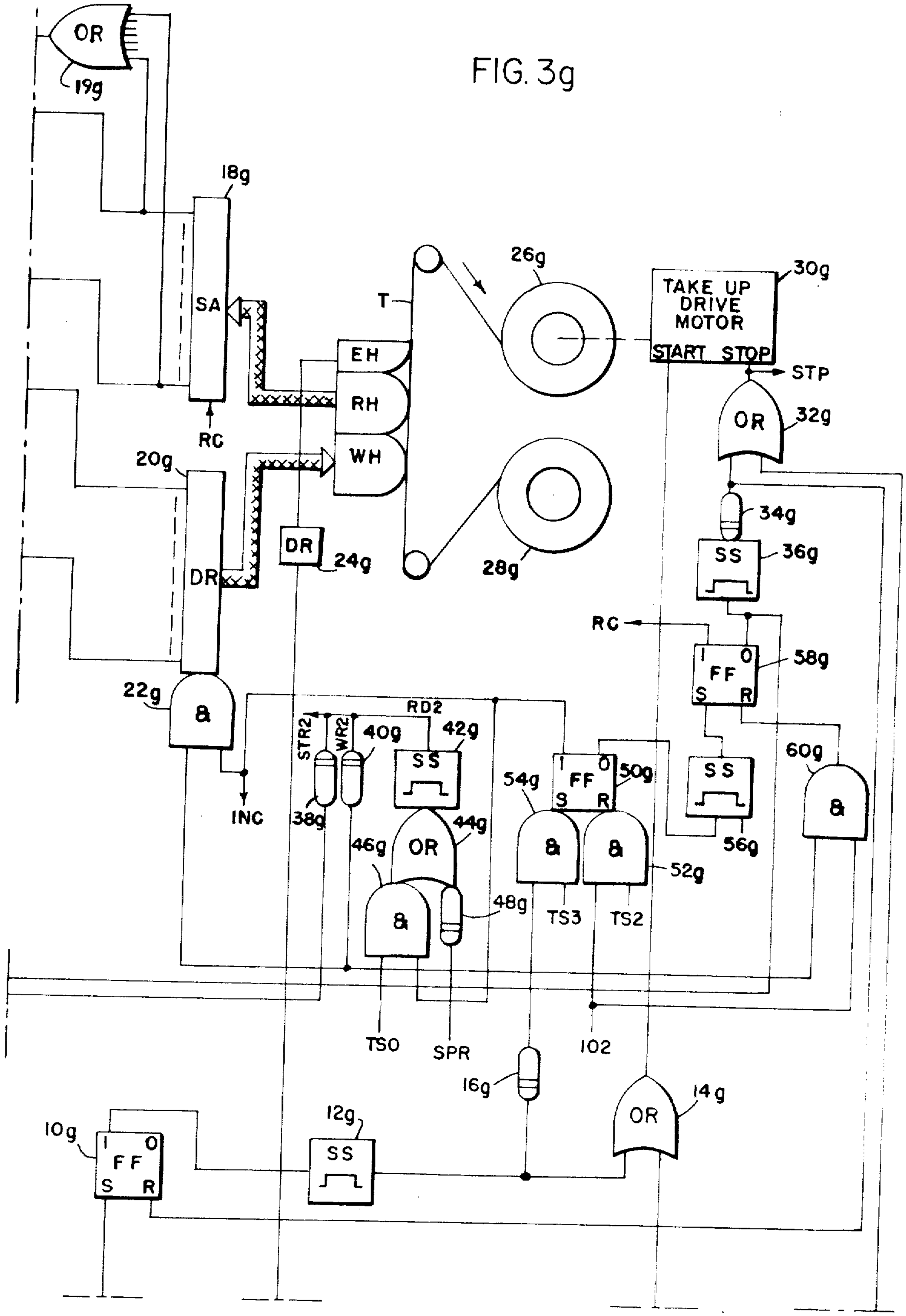
Figure 3H:
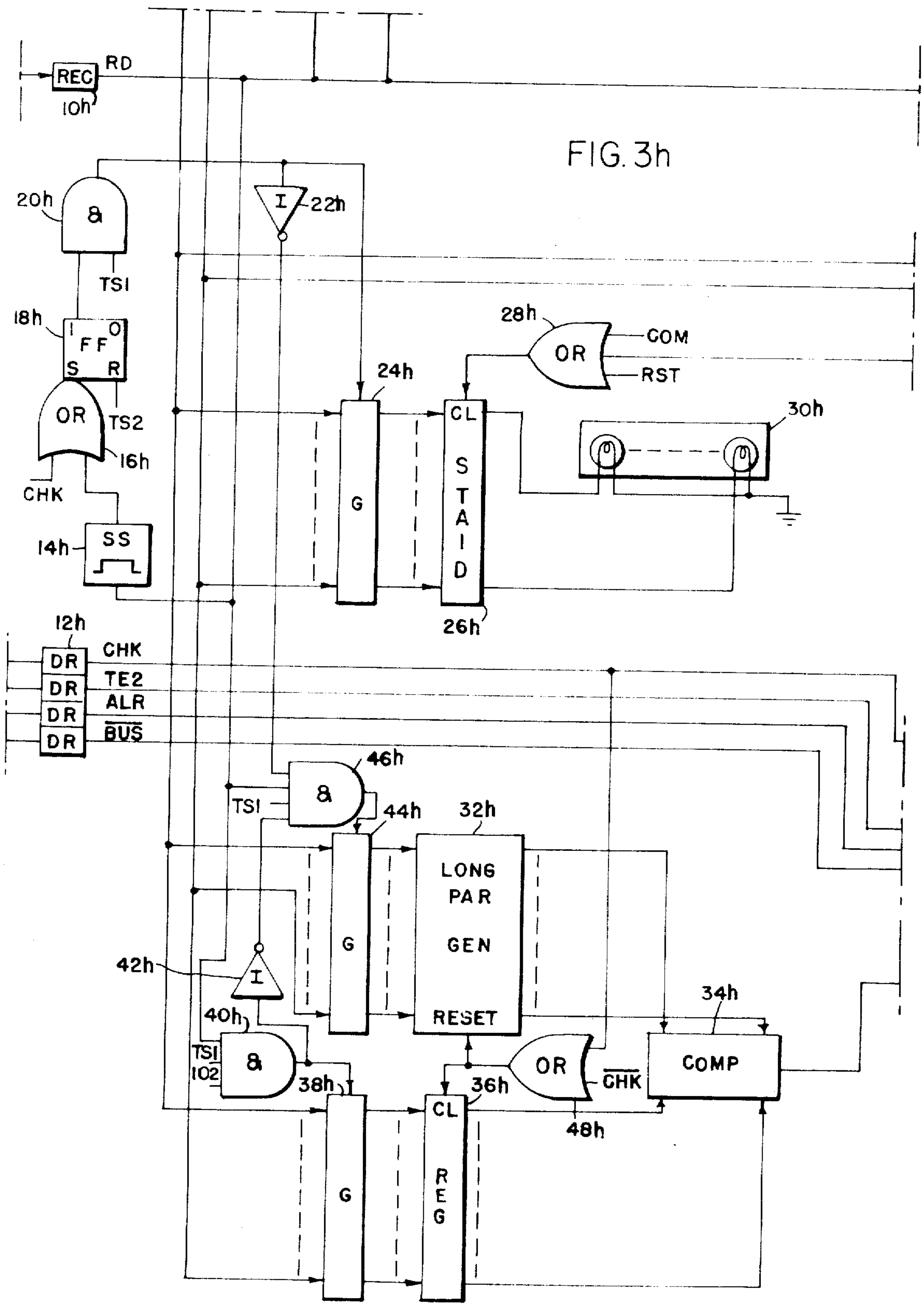
Figure 3I:
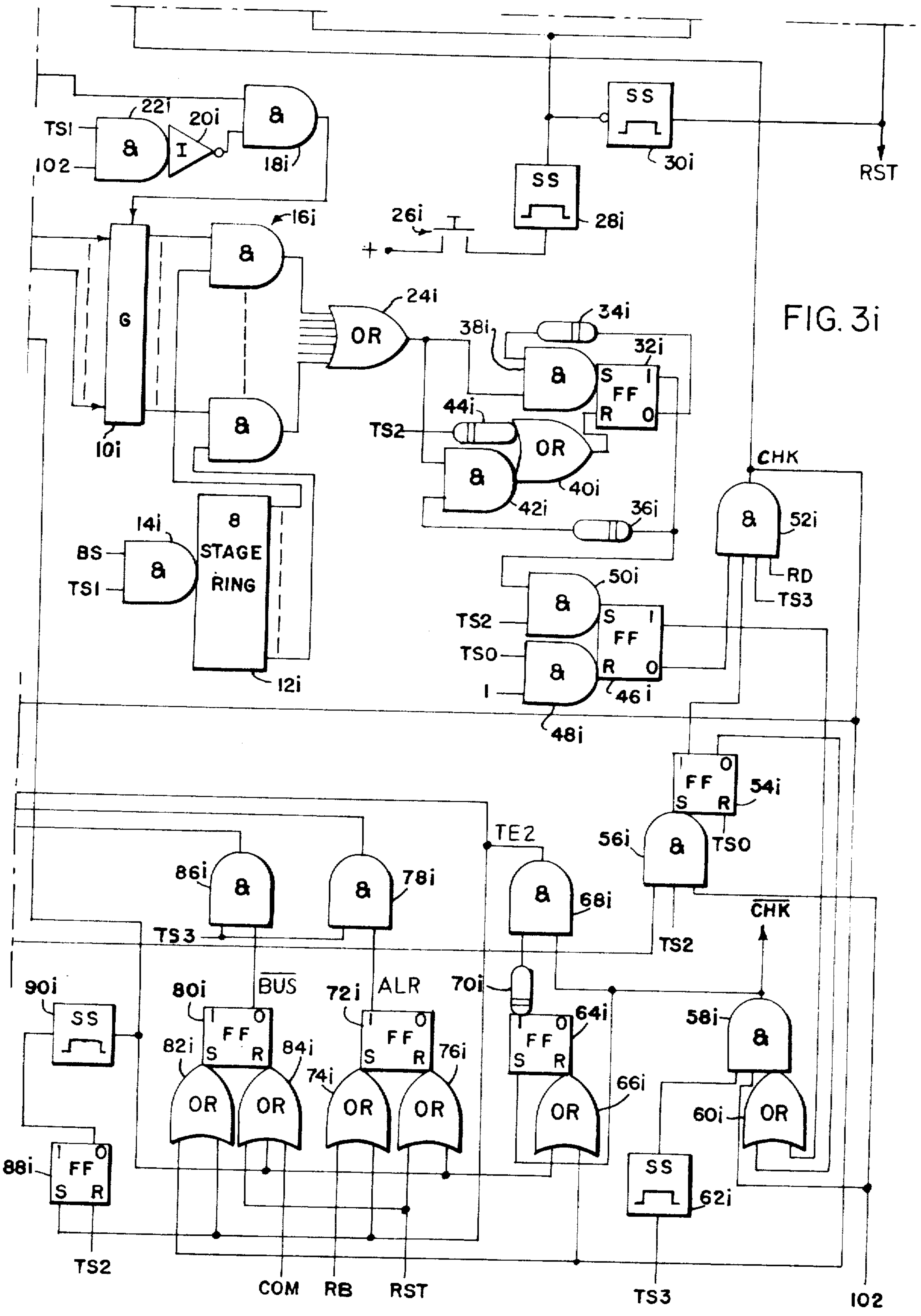

Before proceeding with a detailed description of the preferred embodiment, the meaning of the logic circuit symbols used in FIGS. 2 and 3 is given. It is to be understood that the logic schematics of FIGS. 2 and 3 operate, as is conventional, on a binary voltage level basis wherein the inputs to the circuits and the outputs therefrom always exist at either of two discreet voltage levels, the upper voltage level (H) of the system or the lower voltage level (L) of the system.

An AND circuit is represented by a D-shaped block containing an & symbol. The input lines are always connected to the straight side of the block and the output line is always connected to the curved side of the block. The function of this circuit is to provide an H output voltage only when all input lines are at the H level.

An OR circuit is represented by an arrow-shaped block containing the symbol OR. Input lines are always connected to the concave side of the block and the output line is always connected to the point. The function of this circuit is to provide an H output voltage when any one or more of the input lines is at the H level.

A flip-flop circuit is represented by a rectangular block containing the symbol FF. The input are labeled S (set) and R (reset) and the outputs are labeled 1 and 0. This circuit is bistable in nature and its outputs are always at opposite voltage levels. When an L to H voltage level transition is presented at the S input the 1 output goes to H and the 0 output goes to L unless the outputs are already in such a state in which case the output levels do not change. When an L to H transition is presented to the R input the 0 output goes to H and the 1 output goes to L unless the outputs already exist in such a state in which case there is no change in the output levels.

A single-shot multivibrator is represented by a rectangular block containing the symbol SS. The input line to the circuit is always connected to the left or bottom edge of the block and the output line is always connected to the right or top edge of the block. Any exceptions to this are distinguished by the use of an arrowhead on the output line. The function of a single-shot circuit is to generate an L to H to L square wave output pulse of fixed duration in response to a L to H transition occurring at the input. When a small circle appears at the point where the input line joins the block then the function of the circuit is to provide the square wave output pulse in response to H to L transition at the input.

An inverter circuit is represented by a triangular block containing the symbol I and having a small circle at the point where the output line joins the block. The function of this circuit is to provide an output level which is always opposite to the input level.

A delay circuit is represented by an elongated oval-shaped block with a pair of transverse stripes nearest the input end. The function of this circuit is to generate an output level which follows the input level but which changes state at some fixed period of time after the input changes state.

A gate circuit is a rectangular block containing the symbol G. Inputs into the gate circuit are identified by arrowheads. The function of this circuit is to transfer the voltage levels on a plurality of input lines to an equal plurality of output lines whenever the gate control input line is at the H level. The latter line is a single input connected to one of the ends of the gate block. A gate circuit is usually made up of a plurality of AND circuits, one for each input line (other than the gate control input). Each input into the gate is connected to the input of a different one of the ANDs and each output from the gate is taken from the output of a different one of the AND circuits. The gate control input line is connected to an input of all the AND circuits.

KEYBOARD TERMINAL

A keyboard terminal suitable for use in the system of the present invention is fully described in the aforementioned copending application Ser. No. 834,422. This cross-referenced specification describes a data recording device having a keyboard and a buffer memory adapted to receive data inputs from the keyboard. The description further relates to means for key verifying a message block after it has been entered into the buffer memory and for thereafter reading the message block out of the memory to a tape unit. FIG. 2 of the present specification shows additional control logic circuits adapted to interface with the circuits shown in FIG. 5 of the cross-referenced specification to adapt the keyboard terminal thereof to use with the system of the present invention. The dashed line 100 of FIG. 2 defines the interface.

A positive TAPE signal is presented from the keyboard logic circuits when a message block has been entered and verified in the keyboard buffer memory and is ready for transmission to the tape unit. The TAPE signal is generated by the logic circuits shown in FIG. *5d* of the cross-referenced specification. DATA signals appear in parallel on a plurality of data inputs lines during readout of the message block from the keyboard buffer memory. The gate circuit B106 shown in FIG. *5b* of the cross-referenced specification supplies these signals. A signal "81" is presented whenever the addressing circuits B108 (also shown in FIG. *5b* of the cross-referenced specification) are switched to access the hypothetical 81st character storage location of the keyboard buffer. The signal "81" indicates that a complete 80 character message block has been read out of the keyboard buffer. An EREL signal is generated when the keyboard operator actuates the error release key shown in FIG. 4 of the cross-referenced specification.

Figure 5:
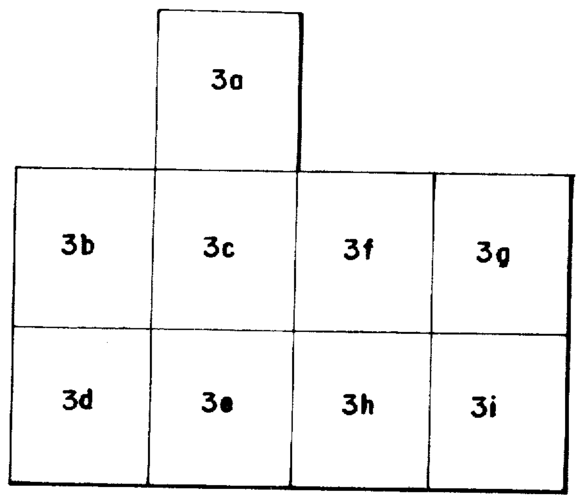
FIG. 5 is a diagram illustrating the manner in which the drawings of FIG. 3 are to be assembled for ease of reference.

As shown in FIG. 2 of the present specification four signals are transmitted to the keyboard logic circuits of FIG. 5 of the cross-referenced specification. The REGEN signal generated at the output of a single-shot 102 is fed to the input of OR-circuit E306 shown in FIG. *5e* of the cross-referenced specification. This signal is used to advance the keyboard buffer readout circuits through a single character readout cycle to present a data character on the DATA lines. It should be noted that for the purposes of adapting the keyboard terminal of the cross-referenced specification to use with the system of the present invention, the output signals generated by AND E290 and single-shot E300 (both shown in FIG. *5e* of the cross-referenced specification) are not employed. The reason for this is that in the cross-referenced specification initiation of the buffer readout cycle automatically occurs when TAPE goes positive and continues thereafter under the control of a set of timing circuits local to the keyboard terminal. In the present system those timing signals cannot be employed during readout of the keyboard buffer since that operation must be synchronized with the multiplexer circuits. The REGEN output from single-shot 102 performs this synchronizing function.

The REKEY PREV REC signal generated at the set output of flip-flop 110 actuates an alarm display at the keyboard which notifies the operator that she must rekey the message block entered just prior to the block she just completed. The REKEY REC signal generated at the output of flip-flop 108 actuates an alarm display at the keyboard which notifies the operator that she must rekey the message block just completed. The OK signal is transmitted to FIG. *5d* of the cross-referenced specification to operate the circuits there shown whereby the keyboard terminal is restored to its initial condition in preparation for the entry of the next message block.

The TAPE signal received from the keyboard terminal is applied to an input of an AND-circuit 28 along with a timing signal TS1 and the output from a decoding circuit 26. AND 28, when enabled, sets a flip-flop 30, the set output from which is a "keyboard ready" signal KBR. KBR is placed on the common cable 10 by a line driver circuit 36 whereupon it is transmitted to the multiplexer. AND 28 and flip-flop 30 perform the function of responding to a polling request from the multiplexer when the keyboard terminal is ready to transmit a message block to the multiplexer.

The KBR signal is fed to the inputs of AND-circuits 38, 74, 118 and 122. AND 38 gates the output from a serdes (serializing-deserializing) register 20 to the common cable 10 via a driver-receiver circuit 40. The serdes register is a well-known form of shift register having both serial and parallel input as well as serial and parallel output capabilities. AND 38 is conditioned by timing signal TS2 to operate only during the TS2 period. AND-circuits 74, 118 and 122 operate under certain logic conditions to be explained in detail subsequently to set flip-flops 70, 104 and 108, respectively. The set output from flip-flop 70 is used to condition and AND-circuit 48 which gates polling data received from the common cable 10 into the serdes register through an OR 44. The output from flip-flop 104 partially conditions and AND-circuit 116 which, when enabled under the proper logic conditions, actuates single-shot 102 to generate the REGEN signal which advances the keyboard terminal buffer memory readout circuits. The set output from flip-flop 108 is used, as previously described, to provide the "REKEY REC" signal to activate the keyboard alarm which notifies the operator that the message block just entered just be rekeyed.

A receiver circuit 50 is connected to the KBR line of common cable 10 and through an inverter circuit 52 supplies the $\overline{KBR}$ signal. The effect of this latter signal is to degate AND 46 whenever any terminal of the system is transmitting the KBR signal. This function is required to prevent any of the data signals being transferred over the common cable from the active keyboard terminal to the multiplexer from entering the serdes registers 20 of the nonactive terminals. On the other hand, when none of the terminals are actively transmitting to the multiplexer the $\overline{KBR}$ signal at all the terminals is at the high level so that AND 46 associated with each terminal permits the entry into the serdes register of each polling address transmitted from the multiplexer. The output from AND 46 is transmitted through OR-circuit 44 to the serial input terminal of the serdes register. The register is serially loaded at TSO time of any cycle during which AND 46 is active. Shift pulses SHF supplied from an AND-circuit 24 in response to bit sync BS timing signals during TSO operate to time the serial entry of the data signals into the register.

At TS2 time of the cycle OR 22 conditions AND 24 to supply shift pulses to shift any data that may be in register 20 to AND 38 via the serial output terminal of the register. If AND 38 is enabled during this shifting operation the data is applied to the common cable for transmission to the multiplexer. If AND 38 is deconditioned the shifting operation simply acts to clear the serdes register.

A plurality of OR-circuits 42 are connected to the bit-parallel input terminals of the serdes register to enable parallel loading of data characters into the register. These inputs are supplied either from the data input lines from the keyboard buffer memory or from either of a pair of gate circuits 54 or 56. The parallel output terminals from the serdes register are connected to the inputs of decode circuit 26 which, as previously described, operates to notify the keyboard terminal when it has been polled from the multiplexer.

Figure 4:
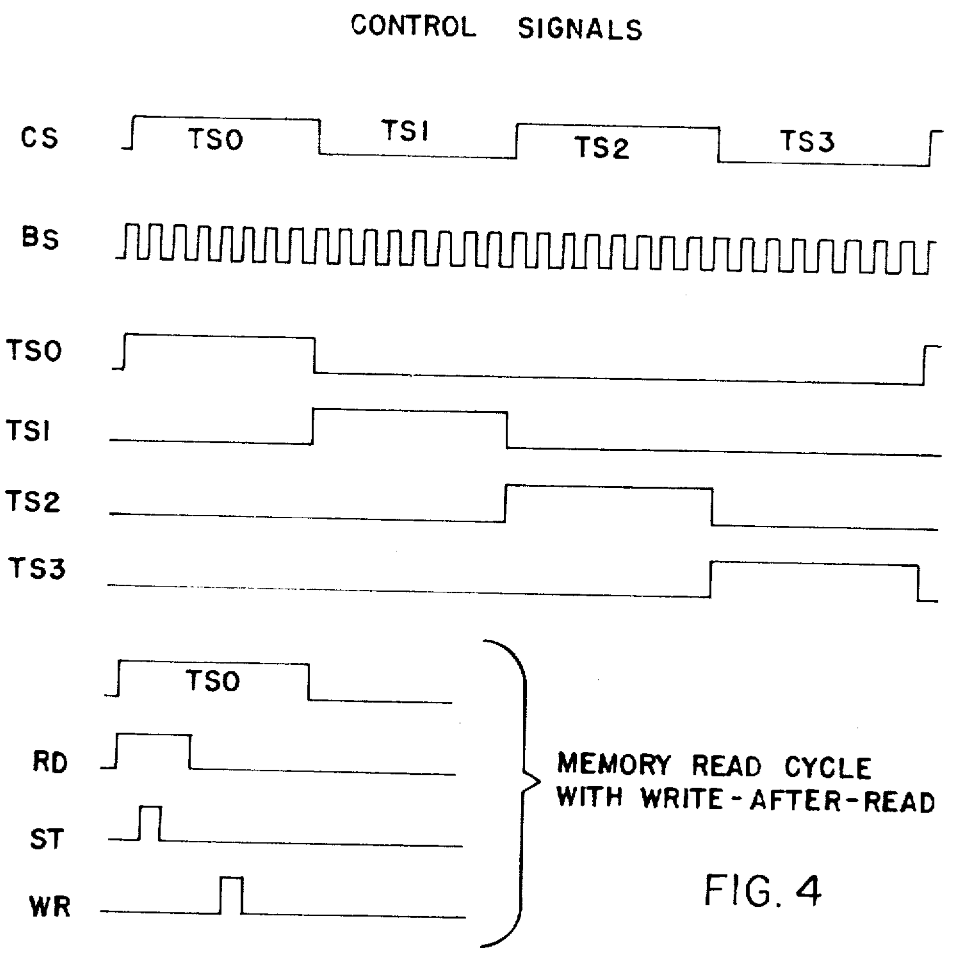
FIG. 4 is a waveform diagram showing the interrelation between the various timing signals generated by the timing circuits of FIG. 3.

A set of receiving circuits 62, 64, 66, 68 and 82 receive the various control and timing signals TE1, BR, OK, BS and CS from the common cable and supply them to the keyboard terminal. The TE1 signal is an error signal which is transmitted from the multiplexer upon detection of an inaccurate message block transfer from a keyboard terminal. The BR signal is another error signal transmitted from the multiplexer whenever a message block has been rejected by the system. The OK signal operates, as previously described, to inform an active terminal that its message has been successfully received by the multiplexer whereupon the terminal is restored to the nonactive state so that it can resume accumulation of message data. The BS signal is, as mentioned above, the bit sync timing signal which is generated in the multiplexer and is used throughout the system to supervise the serial transfer of data. CS is also generated by the multiplexer and is used to reconstruct the basic TSO, TS1, TS2 and TS3 timing signals at the terminals. A single-shot 78 responds on each negative transition (H to L) in the CS signal to produce a square wave output pulse which advances a timing ring 72 through an OR-circuit 76. Similarly, each positive (L to H) transition in CS causes a single-shot 80 to also generate a square wave pulse which advances the timing ring. Ring 72 has four outputs which supply respectively, the four basic cycle timing signals TS0, TS1, TS2 and TS3. The relationship of these signals to the BS and CS timing signals is shown in FIG. 4.

An end of block character (EOBC) generating circuit 60 supplies a predetermined set of encoded outputs to the gate 56. The latter is opened at the appropriate time from an output generated by a single-shot 92 to load an end of block character into the serdes register 20. Single-shot 92 is activated by an AND-circuit 94 at TS1 time of the cycle during which the keyboard buffer memory address circuit switches to the "81" state as indicated by the appearance of the "81" signal at the input of AND 94.

The output from single-shot 92 is also used to set a flip-flop 106. The set output of the latter conditions and AND-circuit 86 which at TS2 time operates to set a flip-flop 84. The set output of the latter partially conditions an AND-circuit 90 which operates at TS1 time to actuate a single-shot 88, the output from which opens gate 54. A longitudinal parity generating circuit 58 operates in a conventional manner during the transfer of the 80 message block characters from the keyboard buffer memory to the serdes register 20 to calculate the parity of each line of data bits in the message block. After all 80 characters have been transferred, the outputs from the generator 58 make up a character representing the longitudinal parity of bits in the message block. This character is loaded into the serdes register through gate 54 after the end of block character has been transmitted and thus the longitudinal parity character is the last character transmitted from the keyboard terminal.

Control flip-flops 112 and 114 are provided at the keyboard terminal to prepare the terminal for the receipt of and response to the polling address which is transmitted from the multiplexer in a special error situation, to be described subsequently, which arises when errors are detected in both the transmission and retransmission of a message block from the multiplexer to the tape unit. AND 130 sets flip-flop 114 in response to the BR signal which, in this error situation, is transmitted to all the keyboard terminals just prior to the transmission of the polling address. Since at this time in the operation of the system $\overline{KBR}$ must be high at all of the terminals, the BR signal activates all of the respective AND-circuits 130 at the terminals to set all of the respective flip-flops 114. Immediately thereafter, the polling address is transmitted and is recognized by only one of the terminals. The address is entered into the serdes registers via an AND-circuit 48 which has been conditioned by the set output from a flip-flop 70 in response to the special error situation. The responsive terminal generates a DECODE signal from its decode circuit 26 which operates to set the respective flip-flop 112. The set output from the latter partially conditions an AND-circuit 124 which is enabled when TAPE goes positive at the time the terminal operator completes the message block she is currently entering. At that time AND 124 sets flip-flop 110, actuating the "rekey previous record" alarm display.

Upon completion of a successful message block transfer from the active terminal to the multiplexer, the OK signal is sent back from the multiplexer and operates through an OR-circuit 120 to reset the control flip-flops 104, 106, 96 and 84. OR 120 also operates to reset the longitudinal parity generator 58. OK also resets flip-flop 30 through an OR-circuit 34, terminating KBR and initiating $\overline{KBR}$. The BR signal also acts through OR 34 to reset flip-flop 30. The delay provided by delay circuit 32 allow time for the setting of flip-flop 108.

MULTIPLEXER

The multiplexer circuits are shown in FIGS. **3*a*, 3*b*, 3*c*, 3*d*, and 3*e*. It is recommended for ease of reference that the five sheets of drawing be assembled in the manner shown in FIG. 5. For additional ease of reference each reference numeral used in FIG. 3 has been provided with a letter suffix indicating the particular sheet on which it appears. For example, the reference numerals used in FIG. 3*a*** are provided with the suffix "*a*."

. The principal components of the multiplexer are a serdes register **68*b* which receives data characters serial by bit from the common cable 10 and transmits data characters (polling addresses) serial by bit onto the common cable, a polling counter 36*d*, a transfer memory 12*c* having five message block sections TM1, TM2, TM3, TM4, and TM5, a set of address circuits 44*c* for accessing the transfer memory, a memory in ring 12*e* and a memory out ring 14*e* for selecting the particular transfer memory section to be written into or read out from, a plurality of memory status flip-flops 20*e*, 22*e*, 24*e*, 26*e* and 28*e* for indicating which sections in the transfer memory are empty and which are full, and a set of time signal generating circuits including a timing ring 10*d*, an oscillator clock 54*d*, a three-stage counter 56*d* and a toggling flip-flop 64*d***.

The serdes register 68b is supplied with parallel data characters at its parallel input side through a set of OR-circuits 42d. These OR circuits channel data characters to the serdes register from either of a pair of gate circuits 38d and 40d. Gate 38d supplies polling address characters from polling counter 36d which controls the normal polling sequence of the system. Gate 40d supplies a polling address character generated by a plurality of OR-circuits 52a.

At TS3 time of a cycle during which polling is called for, either gate 38d or gate 40d (depending upon the logic conditions then prevailing) is opened to transmit a polling address character into the serdes register. The following TS0 time OR-circuit 66b conditions and AND-circuit 64b to transmit BS pulses into the shift input of the serdes register. This shifts the just-entered polling character in serial fashion out of the register and through one of three AND-circuits 72b, 74b or 76b and an OR-circuit 70b to the driver-receiver circuit 18b. The latter places the serialized polling address character onto the common cable for transmission to the keyboard terminals.

When data characters are being transmitted to the multiplexer the driver-receiver circuit 18b feeds the serialized characters into the serial input end of the serdes register through an AND-gate 62b during TS2. Characters, after being thus loaded into the serdes register are shifted out of the register in parallel in response to the following TS3 signal through a gate circuit 84b which is activated by an output from an AND-circuit 86b. Gate 84b presents the characters to the inputs of a character storage register 94b through a set of OR-circuits 90b. Each character is held in register 94b until it is written into the appropriate character storage location of the transfer memory by a set of write driver circuits 10c.

During each transfer memory write cycle the write drivers are actuated by a WR1 output from a single-shot 42c fed through an AND-circuit 20c and an OR-circuit 18c. The write drivers 10c are further used during the transfer memory write cycle to write space (all zero) characters into the end portion of a transfer memory section when the incoming message block has less than 100 data characters.

Each selection of the transfer memory has 102-character storage locations. Location 1 is always used to store the station ID (polling address) character, location 102 is always used for the longitudinal parity character. The intermediate 100 locations are used for the message block data characters. In some instances the message blocks sent from the terminals contain less than 100 data characters. In the present embodiment the blocks have only 80 data characters. Thus, to properly format the data in the transfer memory a decode circuit 108b is provided for detecting the end-of-block character which is transmitted by the terminal immediately following the last (80th data character and just prior to the longitudinal parity character.

The output from decoder 108b activates an AND-circuit 110b which in turn generates a signal EB and sets a flip-flop 98b. The latter circuit deconditions AND 20c to prevent storage of the EOB character in the transfer memory. At the same time EB sets a pair of flip-flops 56c and 62c. The former flip-flop generates at its 1 output a signal SPC which opens a gate circuit 82b to present the space character code (all zeros) from a register 80b to the register 94b via ORs 90b. SPC also activates AND 48c to feed BS pulses to increment the address circuits 44c and activates AND 36c to feed delayed BS pulses to activate the write drivers 10c. This enters space characters into all remaining storage locations, except the last, of the memory section. When location 102 is reached flip-flop 56c is reset to terminate advance of the address circuit.

At the ensuing TS3 time the longitudinal parity character is presented by gate 84b to the register 94b and is written in location 102 immediately thereafter at TS0. Thereafter at TS1 AND 66c resets flip-flop 62c and the 0 output therefrom triggers a single-shot 58c which resets flip-flop 60c and flip-flop 100b to terminate the write cycle control signal WR. The output from single-shot 58c further sets a flip-flop 96b which is reset the following TS3, triggering a single-shot 88b whereupon one of the signals OK, BR or TEI is generated as described subsequently. During transfer memory write cycles the address circuits 44c supply address signals to the selected transfer memory section through one of a set of five gate circuits 22c, 24c, 26c, 28c and 30c. These five gate circuits are opened under control of the five OR-circuits 76c, 78c, 80c, 82c and 84c. A gate-opening output signal is generated from only one of these OR circuits at any given time. Each OR circuit is supplied with inputs from a pair of AND circuits from the set 86c. The left-hand AND circuit of each pair associated with one of the OR circuits controls the output of the OR circuit during write cycles and the right-hand AND controls the output of the OR during memory readout cycles. Each left-hand AND circuit of the group 86c is conditioned by a write control signal WR, the timing signal TS0 and by an output from the memory in ring 12e. Each right-hand AND is conditioned by a read control signal RD, TS0 and by an output from the memory out ring 14e.

The memory in ring 12e supplies the outputs MI1, MI2, MI3, MI4, and MI5 on a mutually exclusive basis. This means that only one of the AND-circuits 86c and thus only one of the OR circuits connected thereto can be active at any given time. The outputs from ring 12e determine which of the five transfer memory sections is to be addressed during any given write cycle. The write signal WR is generated at the set output of a flip-flop 100b which is set through an OR 106b by KBR. After a message block has been successfully written into the selected transfer memory section from a keyboard terminal the signal OK is presented to the input of the ring 12e and advances its output to the next section.

Transfer memory readout cycles are controlled by a flip-flop 44d. When in the set state this flip-flop generates a high level RD signal at its 1 output which signal is employed both in the multiplexer and in the tape unit to condition the control circuits to supervise the transfer of a message block from a section in the transfer memory to the tape unit buffer memory. When flip-flop 44d is in the set condition the low level signal generated from the 0 output deconditions AND-circuits 28d and 74b and this, as explained in more detail subsequently, inhibits the terminal polling operation. Thus, when data is being read out of the transfer memory data cannot simultaneously be read into the transfer memory. Conversely when the write control flip-flop 100b is in the set state and data is being written into the memory from a terminal the low level of $\overline{KBR}$ present at the output of an inverter circuit 24d deconditions AND-circuit 46d, inhibiting the setting of flip-flop 44d and thus preventing initiation of a transfer memory read cycle until at least a time when $\overline{KBR}$ goes high in response to the termination of the KBR signal.

The RD signal partially conditions an AND-circuit 104b which in turn actuates a single-shot 102b each TS0 time to generate therefrom the signal RD1. This latter signal is fed in common to all five transfer memory sections and effects the readout of the data character stored in the particular character location then being addressed by the circuits 44c. Selection of the particular transfer memory section from which this readout occurs is controlled by the gates 22c, 24c, 26c, 28cand 30c. The operation of these gates is, as stated previously, under the control of the right-hand AND-circuit 86c associated with each of the five OR-circuits 76c, 78c, 80c, 82c and 84c. Each of the AND gates in turn is enabled by a coincident combination of the RD signal, TS0 and a selection signal generated by the memory out ring 14e. As with the memory in ring 12e, the five outputs MO1, MO2, MO3, MO4, and MO5 generated by the ring 14e are presented on a mutually exclusive basis, i.e., only one of the five outputs can be high at any given time.

When RD1 comes up at the beginning of TS0 and is impressed in coincidence with an addressing signal from circuit 44c upon a particular character storage location of the memory, signals representing the data bits stored in the location are presented via the transfer memory readout lines to a plurality of sensing amplifiers 14c. Shortly thereafter, at a time determined by a delay circuit 32*c*, a strobe signal ST1 actuated the sensing amplifiers in unison and causes the data character to be read out onto output bus 16*c*. The signals are thereby presented in parallel to the inputs of a gate circuit 68*c* and to the inputs of register 94*b*. Since gate 68*c* is opened in response to the RD1 signal, the data character is loaded into an output register 70*c*. Shortly thereafter, at a time determined by delay circuit 38*c* AND 34*c* passes the WR1 signal to OR 18*c* whereupon the write drivers 10*c* are actuated to read the data character from register 94*b* and enter it back into the same storage location in the transfer memory from which it has just been read. This write-after-read operation is required to prevent destructive readout of data from the transfer memory which could result in loss of data from the system.

The sequence of write signals which effects each character readout operation and the ensuing write-after-read operation is illustrated in the lower portion of FIG. 4. As there noted, the WR signal which effects the writeback must occur after the RD signal has terminated but before the TS0 addressing signal terminates. This requirement, of course, determines the length of the delay which must be imparted by delay circuit 38*c*.

During the read cycle, address circuits 44*c* are incremented each TS3 time by an output from an AND-circuit 50*c* which is conditioned by RD through OR-circuit 52*c*, and which is further conditioned by the reset output from a flip-flop 62*c* and by TS3. The latter signal is fed to AND 50*c* through a delay circuit 54*c* which is provided to prevent the address circuits from switching back to the character location 1 position at the end of the read cycle. The circuit 44*c* thus is held in the location 102 address position at the termination of the read cycle. This same operation is characteristic of all of the address circuits of the system.

After a complete message block has been read out of the selected transfer memory section and into the tape unit buffer memory, a check signal CHK is transmitted to the multiplexer from the tape unit at TS3 time following the transfer of the last character (longitudinal parity character) of the message block. The CHK signal operates through an OR-circuit 11E to advance the output state of the memory output ring 14*e* and further operates to actuate a single-shot 48*d* which generates an output pulse to reset the read control flip-flop 44*d*. As explained subsequently, CHK is generated only if the message block transfer was verified by the error detection circuits in the tape unit. Resetting of flip-flop 44*d* terminates the read cycle.

To enable proper supervision of the loading and unloading of the transfer memory sections, means (not shown) must of course be provided for initializing the memory in ring and the memory out ring to their number 1 output conditions (MI1 and MO1 being high and all of the rest of the output signals being low) when the system is first turned on. This operation is commonly done by providing a homing input to the rings in connection with the "power on" switch of the system. The same provision must also be made for the address circuits and the various control flip-flops of the system. Omission of a description of these various initializing circuits is made herein for the purpose of simplicity.

The flip-flops 20*e*, 22*e*, 24*e*, 26*e* and 28*e* collectively constitute a transfer memory status register for keeping track of which memory sections are "full" and which sections are "empty." It is to be understood that since no "clear" means are shown for the transfer memory there will always be a message block stored in every section since the memory readout operation is nondestructive in nature. However, the status register flip-flops operate on the basis that a memory section is empty if the message block stored therein has been successfully transferred to the tape unit or, if the message block was not successfully transferred, the section is still considered empty if the proper error alarms have been given. A memory section is considered full if a message block has been successfully written into it but has not yet been read out of it.

The initializing circuits which operate when the system is first turned on assure that each of the status register flip-flops is in the reset state. This means that all the 0 output lines from the register are high and all the 1 output lines are low. An OR-circuit 29*e* receiving inputs from all the 0 output lines provides a high level "memory available" signal indicating that at least one section of the transfer memory is empty and thus the memory is in condition to receive input data. On the other hand, OR-circuit 31*e*, which is connected to the 1 outputs from each of the register flip-flops, provides a low level signal at its output which indicates that there is no data available in any section of the transfer memory. The DATA AV output from OR 31*e* is employed to condition AND 46*d* associated with the read control flip-flop and therefore inhibits the initiation of any readout cycle when no data is available in the transfer memory. Likewise, the MEM AV output from OR 29*e* is fed to the inputs of AND-circuits 28*d* and 74*b* to inhibit the initiation of any polling cycle if there are no memory sections available to receive data.

Each of the memory status flip-flops is settable by an output from one of the AND-circuits 30*e*, 34*e*, 38*e*, 42*e* and 46*e*. Each time OK is generated, indicating the successful transfer of a message block into the transfer memory, the AND circuit associated with the memory section just loaded produces an output to set its associated flip-flop. The appropriate AND circuit is selected by the outputs from memory in ring 12*e*, each one of which is directed to a different one of the AND circuits.

A second set of AND-circuits 32*e*, 36*e*, 40*e*, 44*e* and 48*e* is connected to the respective reset inputs of the status register flip-flops. Each of these AND circuits is partially conditioned by a different one of the outputs from memory out ring 14*e* and by either the CHK signal or an error signal TE2, both fed through an OR 11*e*. Each time CHK is generated to indicate the successful transfer of a message block out of the transfer memory the flip-flop associated with the memory section just emptied is reset through the appropriate AND circuit. The same occurs when TE2 is generated to indicate an error-caused message block rejection situation. Delay circuits are provided at the inputs to each of the rings 12*e* and 14*e* to prevent their being switched before or during the time that the status register is changing state.

Error control is provided during the terminal-to-multiplexer transfer operation (write cycle) by a flip-flop 48*b* and associated control circuits which monitor the correctness of the vertical parity of each incoming data character (except the longitudinal parity character). Each "one" bit in a character activates an AND-circuit 60*b* connected to the output of AND 62*b*. The output from AND 60*b* is fed to an AND-circuit 50*b* connected to the set input of flip-flop 48*b* and to an AND-circuit 54*b* connected through an OR-circuit 52*b* to the reset input of flip-flop 48*b*. The AND-circuits 50*b* and 54*b* are conditioned by crossover feedbacks from the opposite outputs from the flip-flop whereupon the flip-flop is controlled to operate in the toggle mode. This means that each input fed to the circuit from AND 60*b* switches the output state of the flip-flop. Delay circuits 46*b* and 44*b* are provided in the usual manner to prevent a "race" condition which would supply simultaneous signals to both inputs of the flip-flop.

A single-shot 16*b* is actuated by AND-circuit 58*b* at TS3 time immediately following the receipt of each data character at the multiplexer. The output from single-shot 16*b* is fed to an AND-circuit 40*b* which samples the output state of flip-flop 48*b* and sets a flip-flop 38*b* if flip-flop 48*b* is found to be in the set state. Immediately after this sampling operation a delay circuit 56*b* passes the output from single-shot 16*b* through OR 52*b* to reset flip-flop 48*b* in preparation for the next incoming character.

AND 60*b* is deconditioned by the reset output from flip-flop 62*c* which is switched to the low-level deconditioning state by the EB output from the end of block decode circuit 108*b* as described above. This inhibits the vertical parity check flip-flop 48*b* from acting on the longitudinal parity character which inhibit function is necessary since the longitudinal parity character does not have vertical parity significance.

At the end of the write cycle single-shot 88b generates an output signal which is fed to three AND-circuits 22b, 28b and 32b. If during the write cycle any character was found to have an incorrect vertical parity flip-flop 38b was set and AND-circuit 32b is activated by the output from single-shot 88b generating the TE1 error signal. This signal is applied by driver circuit 14b to common cable 10 for transmission back to the keyboard terminals and additionally is fed to an OR-circuit 106b, to the set input of a flip-flop 78b and, through a delay circuit 30b, to the set input of a flip-flop 34b. The ensuing output from OR 106b sets The write control flip-flop 100b to throw the system back into a write cycle in preparation for a transmission of the message block from the keyboard terminal. The setting of flip-flop 78b by TE1 prepares AND-circuit 76b to transmit the polling address of the transmitting keyboard terminal back to that terminal the following TS0 time. This is done to load the serdes register of the affected terminal with the polling address so that the ensuing retransmitted message block will be accompanied by a proper station identifying character. The setting of flip-flop 34b by TE1 acting through delay circuit 30b causes AND 32b to be deconditioned and conditions AND 22b.

Thus, if during the retransmission of the message block a vertical parity error is again detected and flip-flop 38b is in the set state at the end of the write cycle, AND 22b is enabled and generates an RE signal which feeds through OR-circuit 24b and is put on the common cable by a driver circuit 10b for transmission back to the keyboard terminals as the BR rejection signal. BR also feeds back through a delay circuit 20b and an OR-circuit 36b to reset flip-flop 34b.

Of course, in any message block transmission if no vertical parity errors are detected flip-flop 38b is in the reset state at the end of the write cycle and when single-shot 88b generates its output an AND-circuit 28b is enabled, generating OK. OK is transmitted via the common cable back to the keyboard terminals through a driver circuit 12b and also feeds through a delay circuit 26b and OR-circuit 36b to reset flip-flop 34b.

For the purpose of displaying and feeding back the station ID character in the event of certain transmission errors, the output lines from register 94b are connected to the inputs of five gate circuits 20a, 22a, 24a, 26a and 28a. These gates are controlled by the five AND-circuits 10a, 12a, 14a, 16a and 18a, respectively. Each of these ANDS is supplied with an input from the location 1 output of address circuits 44c. The other input to these AND circuits is supplied from the output of the left-hand AND-circuit 86c associated with each of the OR-circuits 76c, 78c, 80c, 82c and 84c. These signals are designated G1, G2, G3, G4 and G5, respectively. As previously described, each of these signals is generated each TS0 time of the write cycle to address the transfer memory for writing a character thereinto. Since the number 1 character storage location of each transfer memory section always receives the station ID character of the message block, the AND-circuits 10a, 12a, 14a, 16a and 18a operate to open their associated gate circuits to enter the station ID character into one of the registers 30a, 32a, 34a, 36a or 38a connected to the gate circuits. Thus, each of these five registers receives and stores the station ID character which accompanies the message block stored in the corresponding section of the transfer memory. Register 30a thus stores the station ID character of the message block in section TM1, register 32a receives the station Id for section TM2, register 34a for section TM3, register 36a for TM4 and register 38a for section TM5.

The CL (clear) input for each of the five station ID registers is actuated by an OR circuit to clear the station ID character from the register whenever either of two conditions prevails. The first condition occurs when the associated message block has been successfully read out of the transfer memory and into the tape unit buffer memory. The signals C1, C2, C3, C4 and C5 are generated to denote the occurrence of this condition for each of the five sections of the transfer memory. These signals are taken from the outputs of AND-circuits 32e, 36e, 40e, 44e and 48e, respectively, which are the AND circuits used to reset the flip-flops of the memory status register. These "C" signals are supplied to the five OR circuits connected to the clear terminals of the station ID registers.

The second register clear condition occurs when a message block is unsuccessfully entered into the transfer memory. To clear the station ID registers in this situation, the RE signal generated by AND 22b at the end of the write cycle after detection of the second consecutive vertical parity error in a message block transmission is ANDed with each of the five output signals MI1, MI2, MI3, MI4, and MI5 from the memory in ring 12e. The output signal generated for each of these AND conditions is fed through the associated OR circuit to clear the station ID register.

The output signals from the station ID registers are fed to five different binary displays 40a to provide a visual indication of the terminal origin of the message block stored in each of the transfer memory sections at any given time. The station ID register outputs are also fed via a set of gate circuits 42a, 44a, 46a, 48a and 50a to a series of OR-circuits 52a. Each gate is controlled by an output from memory out ring 14e and thus OR-circuits 52a present signals at their outputs which represent the station ID character of the message block being read from the transfer memory to the tape unit buffer during any given read cycle.

The outputs from OR-circuits 52a are transmitted to the inputs of gate circuit 40d which is controlled (opened) in response to the occurrence of a TE2 signal. As explained in more detail subsequently, this signal is generated in the error situation involving rejection of a message block due to inaccurate transfer between the multiplexer and the tape unit. In this event, the station ID character associated with the erroneous block is gated by gate 40d through OR-circuits 42d and is entered into the multiplexer serdes register 68b. From there, the station ID character is transmitted to the terminals as a polling address to alert the appropriate terminal of the message rejection condition. In this connection TE2 is converted by OR 24b into a BR signal which is also transmitted to the terminals for use in the error notification process.

The basic timing signals for the system are generated by a clock circuit 54d which supplies at its output the BS signal which is applied to common cable 10 via a driver circuit 20d. BS feeds the input of a three stage binary counter 56d, the outputs from which are fed to an AND-circuit 58d. Since all outputs from the counter simultaneously go positive in response to every eighth BS input pulse, AND 58d feeds a pulse to a flip-flop 64d in response to every eighth BS pulse. Flip-flop 64d has its inputs and its outputs interconnected to enable the flip-flop to operate in a toggling mode. Thus, on every input pulse received from AND 58d the output state of flip-flop 64d reverses. This toggling operation is accomplished by connecting the 0 output terminal of the flip-flop back to the set input thereof via a delay circuit 60d and an AND circuit 66d. Similarly, the 1 output terminal from the flip-flop is fed back via delay circuit 62d and AND-circuit 68d to the reset input. The signal supplied at the 1 output is the CS waveform shown in FIG. 4.

CS is transmitted back to the keyboard terminals via a driver circuit 18d and common cable 10 to be utilized at each terminal for generation of the TS timing signals as previously described. At the multiplexer, the TS signals are derived from CS by a pair of single-slot 14d and 16d which transmit alternating pulses to an OR-circuit 12d. The latter actuates a timing ring 10d which generates at its outputs the four timing signals TS0, TS1, TS2 and TS3. The ring is driven in exactly the same manner as previously described with regard to the ring 72 of the keyboard logic circuits (FIG. 2). Each of the four TS timing signals together with the BS timing signal are also used to provide timing control for the tape unit circuits and to that end are transmitted to the tape unit via a set of driver circuits 74c.

TAPE UNIT

The tape unit mechanism and control circuits are schematically illustrated in FIGS. *3f*, *3g*, *3h* and *3i*. The principal components of the tape unit are a tape handling mechanism including a takeup reel 26*g*, a supply reel 28*g*, a takeup drive motor 30*g*, a write head WH, a read head RH and an erase head EH for recording on and reading from a tape T. The tape unit further includes a single message block buffer memory TM, a station ID storage register 26*h*, a set of circuits 32*h*, 36*h* and 34*h* for checking the longitudinal parity of a message block and a set of circuits including an eight-stage ring 12*i* and a toggling flip-flop 32*i* for checking the vertical parity of each character (except the longitudinal parity character) of the message block.

During the read cycle when a message block is being transferred from the multiplexer to the buffer memory TM, a set of receiving circuits 10*f* transmit each message block character to the inputs of a set of OR-circuits 12*f* which in turn feed a set of write drivers 14*f*. The drivers 14*f* apply the data block characters to the memory TM in sync with the operation of an addressing circuit 30*f*. The memory TM has 102 character storage locations and in that respect is identical to each section of the multiplexer transfer memory. Buffer memory TM therefore stores a message block in exactly the form in which it had previously been stored in the transfer memory. That is, the station ID character occupies character location 1, the longitudinal parity character occupies character location 102 and the 100 data characters of the block occupy the intermediate storage locations 2 through 101. As each character appears at the outputs of the receiver circuits 10*f* it is also transmitted to a vertical parity input gate 10*i*, to a station ID input gate 24*h*, to a longitudinal parity character input gate 44*h* and to a storage register input gate 38*h*. Gate 10*i* is opened by its associated control circuits AND 18*i*, AND 22*i* and inverter 20*i* at TS1 time of each timing cycle except the last timing cycle during a transfer of memory read operation. Gate 10*i* thus presents each message block characters except the longitudinal parity character to a set of AND-gates 16*i*. Each of the latter is controlled by a different output of an eight-stage ring circuit 12*i* which is driven by an input AND-circuit 14*i* through a complete eight-position cycle during each TS1 period. Thus, the eight AND-circuits 16*i* connected to the outputs of the ring are sequentially enabled each TS1 time whereupon the character bit signals at the output of gate 10*i* are fed in series through an OR-circuit 24*i* to the vertical parity check flip-flop 32*i*.

The parity flip-flop 32*i*, like its counterpart flip-flop 48*b* of the multiplexer, is placed in the reset state at the beginning of each checking cycle. This is done by timing pulse TS2 which feeds through a delay circuit 44*i* and an OR-circuit 40*i* to reset the flip-flop. The 0 output terminal of the flip-flop is fed back to the set input terminal via a delay circuit 34*i* and an AND-circuit 38*i* while the 1 output terminal is connected back to the reset input terminal via a delay circuit 36*i* and AND-circuit 42*i*, The output from which feeds through OR 40*i*. Thus, each positive input pulse fed into the circuit by OR 24*i* reverses the output state of the flip-flop. If the number of (one) bits in the character is even, and therefore correct, the flip-flop resides in its reset state at the end of TS1. On the other hand, if a vertical parity error occurs, the flip-flop is in its set state at the end of TS1 and the ensuing TS2 signal activates an AND-circuit 50*i* to set a flip-flop 46*i*.

Flip-flop 46*i* has its 1 output connected to an OR-circuit 60*i* and its 0 output connected to an AND-circuit 52*i*. OR 60*i* feeds an input to an AND-circuit 58*i* which also receives an input from the "102" output of address circuits 30*f* and from a single-shot 62*i*. The latter circuit is energized at the beginning of each TS3 period. Thus, at the end of each read cycle AND-circuit 58*i* samples the output state of flip-flop 46*i* and if the flip-flop is in the set state AND 58*i* generates a $\overline{CHK}$ signal which indicates to the system that a vertical parity error was detected in the transfer of a message block to buffer memory TM. AND 52*i* generates CHK at the end of each read cycle to indicate that the message block transfer was successful. To this end AND 52*i* is energized from the reset output of flip-flop 46*i*, by RD, by TS3 and by the set output of a flip-flop 54*i*. The latter circuit operates, as described below, to condition AND 52*i* if the longitudinal parity of the transferred message block was found to be correct.

Gate 44*h* is controlled by an AND-circuit 46*h* to be opened during the read cycle each TS1 period except the first and last. Gate 44*h* presents to longitudinal parity generator 32*h* each of the 100 data characters of the message block. The output from longitudinal parity generator 32*h* at the end of the read cycle is therefore representative of the longitudinal parity of the basic message block (exclusive of the station ID and longitudinal parity characters) as received at the tape unit. Gate 38*h* is controlled by an AND-circuit 40*h* to be opened only during the last TS1 period of the read cycle when the longitudinal parity character received from the multiplexer is present at the outputs of receivers 10*f*. This character is transmitted by gate 38*h* to register 36*h* for storage. A comparator circuit 34*h* provides at its output an indication of the equality of inequality of the generated longitudinal parity character with the transmitted longitudinal parity character.

At the final TS2 time of the read cycle AND 56*i* is energized to sample the state of the comparator output and to set flip-flop 54*i* if that output is positive, indicating an equal comparison. The set output from flip-flop 54*i* therefore conditions AND 52*i* so that upon the ensuing TS3 signal AND 52*i* is enabled to produce CHK (provided, as previously discussed, that flip-flop 46*i* is in the reset state indicative of a successful vertical parity check). If flip-flop 54*i* is reset at this time due to detection of a longitudinal parity error AND 58*i* is activated the following TS3 time to generate $\overline{CHK}$. Upon the occurrence of either CHK or $\overline{CHK}$ at the end of the read cycle an OR circuit 48*h* operates to clear register 36*h* and to restore longitudinal parity generator 32*h* to its initial condition.

If $\overline{CHK}$ is generated a control flip-flop 64*i* is set to register the fact that the first attempted message block transfer was unsuccessful. Further, since CHK was not generated the memory out ring 14*e* is not advanced, the memory status register is not altered and the read control flip-flop 44*d* is not reset, whereupon the multiplexer control circuits remain in the read mode. This causes a retransfer of the complete message block from the transfer memory to the tape unit buffer TM. If at the end of the retransfer read cycle $\overline{CHK}$ is again generated indicating a second consecutive unsuccessful message block transfer, an AND-circuit 68*i*, which is conditioned by $\overline{CHK}$ and the set output from flip-flop 64*i*, is activated to produce TE2. This signal is fed through an OR-circuit 74*i* to set a flip-flop 72*i*, through an OR-circuit 82*i* to set a flip-flop 80*i* and also sets a flip-flop 88*i*.

The set output from flip-flop 72*i* provides the alarm signal ALR which is gated through an AND-circuit 78*i* to one of the driver circuits 12*h* for transmission back to the multiplexer. At the multiplexer a receiver circuit 18*e* feeds ALR to an alarm indicator light 10*e* and to OR-circuit 50*d*. The latter circuit activates single-shot 48*d* to reset the read control flip-flop 44*d*. The TE2 signal is also transmitted back to the multiplexer via a driver circuit 12*h* and a receiver circuit 18*e*. At the multiplexer, TE2 is used to produce BR through OR 24*b* and to actuate a single-shot 53*d* to open gate 40*d*. TE2 also sets control flip-flop 52*d* to initiate the error polling operation and feeds through OR 49*e* to switch the transfer memory status register.

The setting of flip-flop 80*i* terminates $\overline{BUS}$. The TS2 signal generated following the generation of TE2 resets flip-flop 88*i* and thus activates a single-shot 90*i*, the output from which resets flip-flop 80*i* through an OR-circuit 84*i*, resets flip-flop 72*i* through an OR-circuit 76*i* and resets flip-flop 64*i* through an OR 66*i*. The output from single-shot 90*i* is also fed through an OR-circuit 28*h* to clear the station ID register 26*h*.

The resetting of flip-flop 80*i* restores $\overline{BUS}$ to its positive state so that on the ensuing TS3 signal AND 86*i* is activated, transmitting the positive $\overline{BUS}$ to the input of AND 46*d*. When $\overline{BUS}$ has returned to the positive state, the multiplexer is in condition to immediately initiate a new read cycle if the other two conditioning inputs to AND 46*d* are present.

An array of binary display indicator lights 30*h* is connected to the outputs from the station ID register 26*h* to provide a visual indication of the terminal origin of the message block stored in the tape unit buffer memory TM.

Upon a successful transfer of a message block into TM, as indicated by the generation of CHK, a tape write cycle is initiated. CHK sets a control flip-flop 10*g* and the 1 output therefrom actuates a single-shot 12*g*. The output from the latter feeds through an OR-circuit 14*g* and starts the tape takeup drive motor 30*g* to initiate movement of tape T past the transducer heads. The output from single-shot 12*g* is also applied to the input of a delay circuit 16*g* which in turn feeds the signal to an AND-circuit 54*g* connected to the set input of a tape write control flip-flop 50*g*. Delay circuit 16*g* provides a delay period sufficient to allow the tape drive mechanism to accelerate the tape T to the proper recording speed. The first TS3 time following this delay AND 54*g* sets flip-flop 50*g* whereupon the control INC is generated at the 1 output thereof. INC is fed to the input of a pair of AND-circuits 46*g* and 22*g* and to an OR-circuit 36*f*. OR 36*f* conditions AND 34*f* to be enabled each TS3 time to increment the address circuits 30*f* whereupon proper readout access of memory TM is effected.

AND 46*g* is activated each TS0 time following the initiation of INC to energize a single-shot 42*g* through the latter's input OR-circuit 44*g*. Single-shot 42*g* triggers a series of timing pulses RD2, STR2 and WR2. Each sequence of these three pulses controls the readout of a character from TM in exactly the same manner as was previously described in connection with readout of the transfer memory and as is illustrated in the lower portion of FIG. 4. That is, RD2 comes up at the beginning of the TS0 period and is fed to TM where it acts in combination with the addressing signal provided by circuit 30*f* to apply coincidence switching currents to all the storage cores of the addressed character storage location. Shortly thereafter, following a delay period provided by delay circuit 38*g*, STR2 turns on the sense amplifiers 46*f* connected to the TM output lines whereupon the character is loaded into a write register 48*f*. The outputs from register 48*f* are fed back through OR-circuits 12*f* to the inputs of the write driver circuits 14*f* so that after termination of RD2 but before termination of TS0, WR2, which is emitted from the output of delay circuit 40*g*, operates through an OR-circuit 44*f* to energize the write drivers to write the character back into its place in memory TM. WR2 further energizes AND 22*g* to activate driver circuits 20*g* which energize the write head WH to record the character on tape T.

The above-described readout and record cycle is repeated for each character location of TM until each character of the message block is recorded on tape T. After the last character (longitudinal parity character) has been recorded, AND 52*g* is activated to reset the tape write cycle control flip-flop 50*g* whereupon INC terminates and the write cycle is arrested. The 0 output from flip-flop 50*g*, which goes positive, actuates a single-shot 56*g* which in turn sets a read check control flip-flop 58*g*. The 1 output therefrom emits the RC control signal which turns on the tape read sense amplifiers 18*g* and conditions an AND-circuit 26*f*. At the same time the negative level presented at the 0 output from flip-flop 58*g* is employed to decondition AND 52*f* to prevent the clearing of the write register 48*f* at TS1 time. The 0 output from flip-flop 58*g* is further employed to decondition the address circuit input AND 34*f* to prevent the further advance thereof at TS3 time.

As movement of tape T continues, the first recorded character of the message block passes under read head RH and the data bits thereof are sensed and manifested at the outputs of sense amplifiers 18*g*. The output signal generated in response to the sensing of the first bit of the character by amplifiers 18*g* is fed through an OR-circuit 19*g* to trigger a single-shot 60*f* producing a sprocket control output signal SPR. This signal opens a gate circuit 58*f* for a predetermined duration of time to allow all the bit signals of the character to be entered into a read register 56*f*. At the same time SPR is fed through OR-circuit 50*f* to clear the write register 48*f* and is fed through OR-circuit 32*f* to advance the address circuits 30*f*. SPR is also applied through a delay circuit 48*g* and OR 44*g* to a single-shot 42*g*. Thus, after the delay caused by circuit 48*g* single-shot 42*g* generates the sequence of memory readout pulses RD2, STR2 and WR2. The purpose of delay 48*g* is to allow sufficient time for SPR to complete the write register clearing and address circuit incrementing operations.

As each character is thus read out from memory TM and in response to SPR stored in the write register 48*f*, it is presented, in the usual fashion, to OR-circuits 12*f* for writing back into the memory and is also presented to the inputs of a comparator circuit 54*f*. The comparator compares the memory readout character stored in register 48*f* with the character read from the tape which is in register 56*f*. If a match is obtained a positive signal is generated at the output of comparator 54*f* and this output is fed through an inverter circuit 55*f* to decondition AND 26*f*. This inhibits the setting of control flip-flop 20*f* by WR2. However, should the comparator detect an unequal match the ensuing positive level output from inverter 55*f* conditions AND 26*f* and the following WR2 pulse activates the AND to set flip-flop 20*f*.

The message block is thus read from the tape and compared with the message block stored in TM. As the last character is being written back into memory TM by WR2, AND circuit 60*g* generates an output signal which resets flip-flop 58*g* terminating the read control signal RC and activating a single-shot 36*g*. The latter circuit generates an output pulse STP which is fed through a delay circuit 34*g* and an OR-circuit 32*g* to stop motor 30*g*, arresting movement of tape T. The function of delay circuit 34*g* is to establish the standard inter-record gap. STP is fed to the inputs of a pair of AND-circuits 22*f* and 24*f* which sample the output of flip-flop 20*f*. If a match condition was detected for each character of the message block, flip-flop 20*f* is still in the reset condition and AND 24*f* generates a signal COM. COM is applied through OR 28*h* to clear the register 26*h* and is also applied through OR 84*i* to reset flip-flop 80*i* whereupon $\overline{BUS}$ returns to its positive state. If flip-flop 20*f* had been set during the read check cycle STP activates AND 22*f* which generates a signal RB. RB is fed back through a delay circuit to reset flip-flop 20*f* and is further applied to set a flip-flop 18*f*. RB is also fed through OR 74*i* to set flip-flop 72*i*. Flip-flop 18*f* actuates an error alarm light 16*f* at the tape unit and, as previously mentioned, flip-flop 72*i* generates ALR which is fed back to the multiplexer to energize error alarm light 10*e*. Since AND 24*f* was not energized COM did not go positive and flip-flop 80*i* remains in its set state whereby $\overline{BUS}$ remains negative and initiation of any further read cycle is inhibited.

Prevention of further read cycles by a read check error causes a situation whereby the transfer memory rapidly becomes filled to its capacity of five message blocks whereupon the MEM AV signal from OR E29 goes negative and inhibits further polling cycles. This in turn prevents any further transmission of message blocks from the terminals to the multiplexer. As is apparent, the system, in this condition, is totally "hung up" with throughput reduced to zero, and a supervising operator must intervene. Of course, the situation is signalled by the simultaneous actuation of both alarm lights 10*e* and 16*f*. The supervising operator must take note, by observing the station ID display 30*h* at the tape unit and the station ID displays 40*a* at the multiplexer, of the terminal origin of each message block stored in the tape unit buffer memory TM and in the multiplexer transfer memory. The block identified by display 30*h* is the one which has been erroneously recorded on the tape.

The supervising operator must notify the operator of the terminal indicated by display 30*h* that her message block did not get through to the tape so that she will be alerted to reenter the message. If the same operator does not also have a block stored in the multiplexer transfer memory the unsuccessfully recorded block is the block which she last entered into the system. If in addition to the block stored in TM the same operator also has a block stored in the multiplexer transfer memory then the erroneously recorded block is the block entered just prior to her last-entered block. Thus, with the terminal operator properly alerted to prevent loss of the message block, the supervising operator actuates a momentary contact switch 26*i* to energize single-shot 28*i* whereupon the tape motor 30*g* is started, the erase head driver 24*g* is energized and the erroneous block is fed under erase head EH and is erased from the tape. After the full block has been erased single-shot 28*i* times out and the output therefrom goes negative, deactivating erase driver 24*g* and activating a single-shot 30*i* to generate the pulse RST. The latter signal is fed through OR 32*g* to stop motor 30*g* and arrest the tape and is further applied to reset alarm flip-flop 18*f*, turning off indicator light 16*f*, and to reset flip-flops 72*i* and 80*i*, extinguishing alarm light 10*e* and restoring $\overline{BUS}$ to its high level.

Since the most likely cause of a tape read check error is a bad section of tape, the erase and reset operation just described will likely correct the situation since the tape is advanced and a new section positioned beneath the write head. However, should repeated read check errors occur it is more likely that there is a malfunction in either the tape recording circuits or the write or read heads. In this instance the only corrective action would be, after erasing the last erroneous record from the tape, to disconnect the tape unit from the multiplexer and connect a new tape unit thereto.

OPERATION

Having thus described the circuits of the embodiment, a summary description is hereinafter provided of the operation of the system in its various transfer and error detection modes. For purposes of this description it is assumed that initially the transfer memory is empty and the tape unit is not busy (not in the process of recording a block.)

Accumulating a Message Block at a Keyboard Terminal

As previously discussed, the operation whereby a terminal operator keys in an 80 character message block for storage at the keyboard buffer memory and key verifies the data is described in the aforementioned cross-referenced specification Ser. No. 834,422. After the block is completely accumulated and is ready for transmission to the tape unit the signal TAPE (FIG. 2) goes positive.

Polling the Keyboard Terminals

In accordance with the basic assumption that there are no message blocks stored in the transfer memory and the tape unit is not in the busy state, the multiplexer operates in the polling mode wherein each TS3 period during the cycle AND 28*d* (FIG. 3) advances the polling counter 36*d* one count and single-shot 32*d* thereafter pulses gate 38*d* to load the counter output (polling address character) into the serdes register 68*b*. The following TS0 time BS pulses are fed by AND 64*b* to shift the polling character out of the serdes register, through AND 74*b*, OR 70*b* and driver circuit 18*b*, to the common cable 10.

Since no keyboard terminals can be transmitting to the multiplexer at this time $\overline{KBR}$ (FIG. 2) is positive at all terminals and AND 46 at each respective terminal is conditioned to receive the address through its receiver 40. Thus, at each terminal during TS0 AND 46 feeds the polling address through OR 44 into the terminal serdes register 20. On the following TS1 AND 28 at each terminal is strobed to sample the output of decode circuit 26. The polled terminal responds with a positive output from its decode circuit which activates AND 28 if TAPE at that terminal is positive. If TAPE is positive, indicating that the terminal has a message block ready for transmission, AND 28 sets flip-flop 30 and KBR goes positive. The latter signal is fed onto the common cable by driver 36 whereupon $\overline{KBR}$ goes negative at all the terminals and arrests the polling operation. If the TAPE signal at the polled terminal is not positive the polling operation continues with the advancement, the next TS3 interval, of the polling counter.

Terminal-To-Multiplexer Transfer (Write Cycle)

When AND 28 at the polled terminal is receiving a positive TAPE signal and generates an output at TS1 of the polling cycle, KBR goes positive at the terminal and causes $\overline{KBR}$ to shift low at all the terminals, as mentioned above. This deconditions all of the AND circuits 46 so that no further data characters can be fed into the terminal serdes registers. At the same time KBR at the responding terminal conditions its AND 38 so that during the following TS2 interval the terminal polling address stored in the serdes register is shifted therefrom and is placed in bit-serial form back on the common cable through AND 38 and driver 40.

At the multiplexer (FIG. 3) KBR is received at TS1, by receiver 22*d* whereupon ANDs 62*b* and 58*b* are conditioned and ANDs 28*d*, 74*b* and 46*d* are deconditioned to terminate the polling operation and prevent initiation of a transfer memory read cycle. Thereafter, at TS2 receiver 18*b* feeds the received serialized polling address character (which is now designated the station ID character) through AND 62*b* and loads it into the multiplexer serdes register 68*b*. KBR also sets the write cycle control flip-flop 100*b*, conditioning ANDs 86*b*, 20*c* and 50*c*. In addition, the WR output from flip-flop 100*b* conditions the left-hand AND-circuit 86*c* associated with OR 76*c*. That AND circuit is also receiving an input MI1 from the "1" output of the memory in ring 12*e*.

At TS3 following the TS2 interval when the station ID character was loaded into register 68*b* gate 84*b* is opened, loading the character into the register 94*b*. Shortly thereafter, AND 50*c* feeds an input to address circuits 44*c*, switching the output therefrom to "1" address position.

Next, at TS0 time, single-shot 42*c* is triggered to activate the write drivers 10*c* through AND 20*c* and OR 76*c* passes an output from its associated left-hand AND 86*c* to open gate 22*c*, addressing storage location 1 of transfer memory section TM1. This loads the station ID character into that storage location. At the same time the station ID character is passed through gate 20*a* and loaded into register 30*a*.

The following TS1 signal operates at the keyboard terminal (FIG. 2) to energize AND 116, triggering single-shot 102 to produce a REGEN pulse which is utilized at the keyboard memory readout circuits to read the first data character out of storage location 1 of the keyboard memory. An instant later, this character is presented on the data lines and is loaded into the serdes register through OR-circuits 42. The following TS2 interval, the data character is shifted out of the serdes register, through AND 38 and is placed on the common cable by driver circuit 40. At the multiplexer (FIG. 3) the data character is loaded into serdes register 68*b* and is written into storage location number 2 of transfer memory section TM1 the following TS0 time.

The above-described cycle is repeated for each of the following 79 machine cycles until all 80 data characters have been read out of the keyboard memory and written into the transfer memory at storage locations 3 through 81 respectively.

Following this, the next REGEN signal generated by single-shot 102 (FIG. 2) brings "81" positive and terminates the keyboard memory readout cycle. "81" activates AND 94, causing single-shot 92 to open gate 56 and to set flip-flop 106. Thus opened, gate 56 passes the end-of-block (EOB) character from register 60, through OR-circuits 42, into the serdes register 20.

Next, at TS2 time the EOB character is transmitted to the multiplexer. The following TS3 time AND 110*b* (FIG. 3)

generates EB which sets flip-flop **98*b* to decondition AND 20*c* so that the write drivers 10*c* do not operate to write the EOB character into the transfer memory. Further, EB sets flip-flops 56*c* and 62*c*, triggering the "space fill" operation whereby space characters (all zeros) are written from register 80*b* into storage locations 82 through 101. The next TS1 interval, at the keyboard terminal (FIG. 2), single-shot 88 is triggered to open gate 54, loading the longitudinal parity character into the serdes register 20. This character is transmitted to the multiplexer during the next TS interval and is written into the transfer memory at storage location 102** the following TS0 time.

Thereafter, at TS1 and **66*c* is activated to reset flip-flop 62*c* whereupon single-shot 58*c* is triggered to reset the write control flip-flop 100*b* and to set flip-flop 96*b*. The next TS3 pulse resets flip-flop 96*b*, triggering single-shot 88*b* to sample the output of the vertical parity check flip-flop 38*b*** and to generate either OK or TE1, depending on the state of the flip-flop.

Assuming that OK is generated, AND **30*e* sets flip-flop 20*e* of the transfer memory status register bringing up the DATA AV output of OR 31*e* to indicate that a message block is now available in the transfer memory. Further, OK advances the memory in ring 12*e*, activating MI2 and terminating MI1. Also, OK is transmitted via the common cable back to the terminals where it is received by the respective receiving circuits 66 (FIG. 2) and is transmitted thereby to OR-circuit 34 and 120**, dropping KBR and resetting the remaining keyboard control circuits of the keyboard terminal to prepare the terminal for accumulation of a new message block. When KBR shifts low $\overline{\text{KBR}}$ shifts high at all the terminals, preparing them to receive polling addresses when polling resumes.

Automatic Keyboard-To-Multiplexer Retransfer and Block Reject Sequence

If a vertical parity error is detected during the keyboard-to-multiplexer transfer operation, TE1 is generated at the end of the cycle instead of OK. TE1 sets the write control flip-flop **100*b* and also sets flip-flops 34*b* and 78*b*, conditioning AND 76*b*. Further, TE1 operates through OR 34*d* to open gate 38*d*, entering the polling address of the active terminal into the serdes register 68*b*. TE1 further is transmitted over the common cable to the terminals and operates through OR 120 to restore the control circuits of the active terminal in preparation for another write cycle. Also, TE1 energizes AND 74 (FIG. 2) at the active terminal to set flip-flop 70 whereupon AND 48 at the active terminal is conditioned It is to be noted that KBR is still positive so that the ANDs 46** at all the terminals are deconditioned.

During the TS0 interval following generation of TE1 the polling address of the active terminal is shifted out of serdes register **68*b*, through AND 76*b* and OR 70*b* and the driver circuit 18*b* to the common cable 10, whereupon it is channelled through receiving circuit 40 at the active terminal and is entered into the serdes register 20** thereof.

Since OK was not generated TAPE is still positive whereupon on the following TS2 signal the station ID of the active terminal is retransmitted to the multiplexer for storage in location 1 of transfer memory section TM1, initiating a retransmission of the message block which thereafter is carried out in exactly the same manner as described above for the initial transfer.

If at the end of the retransmission OK is generated, the write cycle is terminated in the normal fashion. However, if another vertical parity error is detected AND **22*b* is energized at the end of the cycle to produce RE, which feeds through OR 24*b* and causes a BR signal to be transmitted back to the terminals via driver 10*b*** and the common cable.

BR is received at all of the terminals but energizes AND 122 (FIG. 2) at only the active terminal (due to the presence of KBR), setting flip-flop 108 which produces the "rekey record" error alarm signal REKEY REC at the keyboard terminal to inform the operator thereof that the just-completed message block must be rekeyed. The REKEY REC signal which is transmitted to the keyboard is employed in lieu of OK to restore the keyboard circuits to prepare the terminal for reentry of the message block. BR also operates through ORs 120 and 34 of the active terminal to restore the control circuits whereupon KBR negative and $\overline{\text{KBR}}$ at all of the terminals goes positive to permit resumption of the polling operation when it is called for by the system. It is noted that the multiplexer memory in ring **12*e* is not advanced and flip-flop 20*e*** of the transfer memory status register is not set since the message block was rejected and thus not entered into the system. Polling thus immediately resumes since there is no valid data to be read out of the transfer memory.

Multiplexer-To-Tape Unit Transfer (Read Cycle)

Assuming successful transfer of the message block into the transfer memory, DATA AV goes positive as does $\overline{\text{KBR}}$. Since the tape unit is not in the process of recording at this time, $\overline{\text{BUS}}$ is positive. Thus, AND **46*d* is immediately energized following the generation of OK and the read control flip-flop 44*d*** is set, bringing RD positive.

When flip-flop **44*d* is set, the 0 output therefrom deconditions ANDs 28*d* and 74*b*, preventing any further polling operations. The polling counter 36*d* remains set at the address of the last-polled terminal. The positive RD signal conditions ANDs 104*b*, 34*c* and 50*c* and also conditions the right-hand AND 86*c* associated with OR 76*c*. RD is further transmitted to the tape unit circuits via driver 16*e* and receiver 10*h* and is there employed to condition ANDs 42*f*, 34*f*, 18*i*, 46*h*, 40*h* and 52*i*, and to trigger single-shot 14*h*. During the TS3 interval that RD goes positive, AND 50*c* is activated to step the output of address circuits 44*c* to the "one" position and AND 34*f* is activated to step the output of address circuits 30*f*** to the "1" position.

Thereafter, at TSO AND **104*b* operates to trigger single-shot 102*b*, generating RD1 which is fed to the transfer memory. At the same time the right-hand AND 86*c* associated with OR 76*c* is energized to open gate 22*c*, whereby storage location 1 of transfer memory section TM1 is accessed for readout. The output WR1 from single-shot 42*c* produces ST1 which strobes the sense amplifiers 14*c* to present the readout character to the output register 70*c* for storage and transmission to the tape unit via drivers 72*c*. At the same time the readout character is fed back to register 94*b*, where it is also stored. Shortly thereafter, WR1 energizes AND 34*c* to activate the write drivers 10*c*** to write the readout character back into storage position 1 of section TM1.

Next, TS1 comes up, energizing AND **42*f* and triggering single-shot 40*f* whereupon the tape unit write drivers 14*f* are activated to write the character, which is present at the outputs of receiver 10*f*, into storage location 1 of the tape unit buffer memory TM. This first character, which is the station ID character, is also presented to gate 24*h* which, at TS1, is opened by the output from AND 20*h*. The station ID character is thus stored in the station ID register 26*h*. Thereafter, at TS2, flip-flop 18*h* is reset, deconditioning AND 20*h* whereupon gate 24*h* remains closed for the rest of the read cycle. Similarly, the output from inverter 22*h*** is forced positive for the rest of the cycle.

At the same time gate **24*h* is opened, AND 18*i* generates an output which opens gate 10*i*, presenting the station ID character to the vertical parity check circuits. The character is serialized by the outputs of ring 12*i* acting on ANDs 16*i* and the toggling flip-flop 32*i* counts the number of "1" bits as previously described. Gate 10*i* is opened each of the first 101 TS1 intervals of the read cycle. During the last TS1 interval AND 22*i* is activated and thus inhibits AND 18*i* whereupon gate 10*i*** remains closed.

On the TS3 interval following storage of the station ID character, address circuits **44*c* and 30*f* are pulsed through ANDs 50*c* and 34*f***, respectively, advancing their outputs to the number 2 storage locations of the transfer and tape unit memories, respectively.

On the next TSO, single-shots 102*b* and 42*c* are again triggered to read the second character out of transfer memory section TM1 whereupon it is written into storage location 2 of the tape unit memory the following TS1. At this same time AND 46*h* is energized to open gate 44*h* whereby the first data character of the block is fed to the inputs of longitudinal parity generator 32*h*. Gate 10*i* also opens to present the character to the vertical parity check circuits.

The above-described character transfer cycle is thereafter repeated each of the next 99 machine cycles whereupon the characters stored in storage location 3 through 101 of transfer memory section TM1 are written into the corresponding character storage locations of the tape unit buffer TM.

At TS3 time following the storage of a character in location 101, address circuits 30*f* are advanced to position 102. The "102" output from circuit 30*f* is presented to the inputs of AND-circuits 40*h*, 58*i*, 56*i* and 22*i*. AND 40*h* is activated the following TS1 time to gate the final character (longitudinal parity character) of the message block into register 36*h* at the same time that the character is being stored in location 102 of memory TM. It is to be noted that the output from AND 40*h* deconditions AND 46*h* through inverter 42*h* so that the longitudinal parity character is not fed to the input of longitudinal parity generator 32*h*. At the same time, AND 22*i* operates through inverter 20*i* to decondition AND 18*i* whereby the vertical parity check gate 10*i* is prevented from presenting the longitudinal parity character to the vertical parity check circuits.

The following TS2 time AND 56*i* samples the output from comparator circuit 34*h* and sets flip-flop 54*i* if that output indicates a match between the generated longitudinal parity character and the stored longitudinal parity character. The following TS3 time, AND 52*i* operates to sample the 1 output from flip-flop 54*i* and the 0 output from flip-flop 46*i*. At the same time AND 58*i* operates to sample the 1 output from flip-flop 46*i* and the 0 output from flip-flop 54*i*. If the 0 output from flip-flop 46*i* and the 1 output from flip-flop 54*i* are both positive, AND 52*i* is activated, generating CHK. However, if either of these flip-flop outputs is negative, AND 58*i* is energized to generate $\overline{CHK}$ and AND 52*i* is inhibited.

If CHK goes positive it is an indication that no vertical parity error was detected during the message block transfer and that the generated longitudinal parity character agreed with the transmitted longitudinal parity character. This, of course, indicates that the transfer was accurate. CHK is fed to the set input of flip-flop 10*g* to initiate a tape write cycle and is fed back to the multiplexer via a driver 12*h* and receiver 18*e* to reset flip-flop 20*e*, to advance the memory out ring 14*e* and to reset the read control flip-flop 44*d*. CHK is also employed at the tape unit to set flip-flop 80*i* to shift the $\overline{BUS}$ signal negative, which indicates that the tape unit memory TM is busy (it is being used to supply data to the recording circuits during the tape write operation) and thus cannot accept new data.

Automatic Multiplexer-To-Tape Unit Retransfer and Block Reject Sequence

If during a multiplexer-to-tape unit message block transfer either a vertical parity or a longitudinal parity error is detected, $\overline{CHK}$ is generated in place of CHK. $\overline{CHK}$ sets flip-flop 64*i* to register the fact that the first attempt at transfer of the block was unsuccessful. $\overline{CHK}$ is also fed through OR 48*h* to clear the register 36*h* and is fed through OR 16*h* to set flip-flop 18*h*. Since CHK is not generated at this time the read control flip-flop 44*d* remains set and RD stays high. The system thus remains in the read mode and the address circuits 44*c* and 30*f* continue cycling to effect a second transmission of the same message block from section TM1 of the transfer memory to the tape unit buffer memory TM. This transfer is carried out in a manner identical to that just described.

If at the end of this second transfer operation CHK is generated, indicating a successful transfer, flip-flop 64*i* is reset and operation proceeds in a normal fashion with the initiation of the tape write cycle. However, if $\overline{CHK}$ is again generated, AND 68*i* is activated producing TE2. TE2 sets the alarm flip-flop 72*i*, terminates $\overline{BUS}$ by setting flip-flop 80*i* and sets flip-flop 88*i*. The ALR signal generated by flip-flop 72*i* is fed back to the multiplexer to actuate error indicator light 10*e* and to reset flip-flop 44*d*. TE2 is further fed back to the multiplexer via driver 12*h* and receiver 18*e* and operates through OR 49'e to reset flip-flop 20*e* and further operates through OR 11*e* to advance the memory out ring 14*e*. Also, TE2 activates single-shot 53*d* and is fed through OR 24*b* to be transmitted as a BR signal back to the terminals. The output from single-shot 53*d* opens gate 40*d* whereby the station ID character associated with the erroneously transferred message block is loaded into the serdes register 68*b* from the register 30*a*. TE2 also sets flip-flop 52*d* to condition AND 72*b* during the ensuing TSO time to permit the transmission of the station ID character back to the terminals.

At the terminals (FIG. 2), the BR signal operates in coincidence with $\overline{KBR}$ to energize the ANDs 130, setting the respective flip-flops 114 and conditioning the associated ANDs 126. Immediately thereafter, when the station ID character is transmitted to the terminals as a polling address, the terminal identified by the address generates an output from its decode circuit 26 which energizes its AND 126 to set the corresponding flip-flop 112. This then conditions AND 124 so that when TAPE goes positive upon completion of the message block which the operator is then entering, flip-flop 110 is set to energize the "rekey previous record" alarm at the keyboard.

At TS2 following generation of TE2 flip-flop 88*i* (FIG. 3) is reset, triggering single-shot 90*i* whereupon $\overline{BUS}$ returns positive and the alarm signal ALR is terminated. Also, flip-flop 64*i* is reset and register 26*h* is cleared. On the ensuing TS3 interval AND 86*i* transmits the high level $\overline{BUS}$ signal back to the multiplexer where it partially conditions AND 46*d*. However, since flip-flop 20*e* had been reset by TE2, all flip-flops of the transfer memory status register are in the reset state and DATA AV is negative. The system thus resumes polling.

Tape Write Cycle and Read-After-Write Check

When CHK sets flip-flop 10*g* the 1 output therefrom triggers single-shot 12*g*, generating an output pulse which is fed to start the tape drive motor 30*g* and to initiate the readout of the message block from memory TM. Initiation of readout is slightly delayed by delay circuit 16*g* to allow the drive motor to accelerate the tape T to the proper recording speed.

Thereafter, AND 54*g* sets the tape write control flip-flop 50*g*, generating INC. INC conditions ANDs 46*g*, 22*g* and 34*f*. Thereafter, each TSO pulse activates AND 46*g* to trigger RD2 and the ensuing strobe and writeback pulses STR2 and WR2. AND 22*g* feeds WR2 to the write head driver circuits 20*g* to record the character which has been read out of the memory TM into the write register 48*f*.

This memory readout cycle is repeated 102 times to effect recording of the entire message block on the tape. When this recording is complete, the "102" output from address circuits 30*f* activates AND 52*g*, resetting flip-flop 50*g* and triggering single-shot 56*g*. This sets flip-flop 58*g*, bringing RC positive whereupon the read head output amplifiers 18*g* are turned on. As the tape continues forward feeding, each character is thereafter read from the tape and causes the generation of an SPR pulse from single-shot 60*f*. SPR gates each character into read register 56*f*, advances the address circuits 30*f* and triggers the RD2, STR2, and WR2 pulse sequence from the output of single-shot 42*g*.

Thus, as each character is read from the tape the corresponding character from the memory TM is read out into register 48*f* and is compared with the tape character by comparator 54*f*. Any unsuccessful comparison activates AND 26*f* to set flip-flop 20*f*.

After the last character of the block is read from the tape, the "102" output from address circuits 30f energizes AND 60g to reset flip-flop 58g triggering single-shot 36g to generate STP which stops the drive motor 30g. STP also samples ANDs 22f and 24f and if the read-after-write check operation was successful the latter AND generates COM which resets flip-flop 80i and restores $\overline{BUS}$ to its high level to prepare the system for the next read cycle.

RECOVERY FROM READ-AFTER-WRITE ERROR

If STP produces an output from AND 22f the resulting RB signal is an indication of a read-after-write error. RB sets flip-flop 18f which actuates the tape unit error alarm light 16f. RB also sets flip-flop 72i, generating ALR which is fed back to the multiplexer and activates the multiplexer error alarm light 10e. Since COM is not generated, flip-flop 80i remains set and $\overline{BUS}$ remains low. This deconditions AND 46d and prevents initiation of any further read cycles.

While further read cycles are prevented, further polling cycles and write cycles are not prevented and the system continues polling the keyboard terminals and loading message blocks into the transfer memory until the transfer memory fills to capacity. At this time the system cannot operate further until the supervising operator intervenes to perform certain recovery procedures at the tape unit. These procedures call for the operator to take note of the terminal origin of each message block stored in the transfer memory and in the tape unit memory. This is done by reading the station ID displays 30h and 40a. This enables the supervising operator to alert the appropriate keyboard terminal operators in the event the message blocks cannot eventually be transferred out of the memories and onto tape.

After noting the terminal identification of the message blocks, the operator actuates momentary contact switch 26i to advance the tape one message block increment and to erase the erroneously recorded block. At the end of this operation single-shot 30i generates RST which is fed to reset flip-flops 80i and 72i. This restores $\overline{BUS}$ to the high level and terminates ALR. This permits the system to resume operation and since the transfer memory is filled to capacity the system will immediately switch into the read mode with the setting of flip-flop 44d.

After a message block has been transmitted from the transfer memory to the tape unit memory the system shifts into a tape write cycle and during that cycle, since $\overline{BUS}$ is low, polling is resumed. As soon as COM is generated, signalling the completion of a successful tape write cycle, $\overline{BUS}$ is returned to its high level and polling is interrupted while the system shifts back into a read cycle to transfer another message block from the transfer memory to the tape unit memory.

For certain types of applications it may be desirable to simplify the system by eliminating the automatic "error polling" operation which, in the above-described embodiment, comes into play upon detection of two consecutive erroneous multiplexer-to-tape unit transfers of the same message block. To simplify this operation the same error alarm and recovery procedures can be used as are used in the above-described embodiment in read-after-write check situation. In other words, the automatic reset circuits including flip-flop 88i and single-shot 90i can be removed whereupon flip-flop 80i remains in the set state following generation of the TE2 error signal. This, then, would cause the system to "hang up" just as in the above-described read-after-write error situation.

In such a modification of the system, TE2 cannot be used at the multiplexer to reset the transfer memory status register since that would clear the station ID register 30a, before the supervising operator would have a chance to note the terminal origin of the erroneous message block. Instead, the transfer memory status register reset function must, in the TE2 error situation, be performed by RST to tie it to the manual reset operation. In addition, it would be advisable to provide five display lights driven by the memory out ring signals MO1 through MO5 to enable the operator to tell which of the displays 40a is applicable to the erroneous message. Finally, inhibit means should be provided to prevent erasure of a message block when switch 26i is operated in the TE2 error situation.

It will be appreciated that various additional changes in the form and details of the above-described preferred embodiment may be effected by persons of ordinary skill without departing from the true spirit and scope of the invention.

I claim:

1. In a data transfer system for channelling a message from any one of a plurality of message input terminals to a single-message processing station, the combination comprising:
   - a transfer memory having a number of message storage sections less than the number of said input terminals, said memory having a single set of input lines common to all said sections, a single set of output lines common to all said sections and a single addressing circuit for addressing one said section at a time for both input and output operations;
   - loading means for periodically transmitting polling requests to said terminals to initiate the transfer of a message from one of said terminals to said transfer memory;
   - first status means for generating a first status signal indicative of the presence of at least one message in said transfer memory;
   - demand means for generating a demand signal indicative of the requirement for a message at said processing station;
   - unloading means for transferring a message from said transfer memory to said processing station, said unloading means including blocking means for inhibiting the operation of said loading means during operation of said unloading means; and
   - control means for sampling the condition of said status means and said demand means just prior to the initiation of each said polling request and for actuating said unloading means in response to coincident status and demand signals.

2. The data transfer system set forth in claim 1, further comprising:
   - second status means for generating a second status signal indicative of the nonavailability of an empty message storage section in said transfer memory; and
   - means for inhibiting the operation of said loading means in response to said second status signal.

3. The data transfer system set forth in claim 1, further comprising:
   - first error means for checking the accuracy of each message transfer from a terminal to said transfer memory, said first error means generating an OK signal upon completion of a successful transfer and a TEI signal upon detection of an unsuccessful transfer;
   - lockout means at each said terminal for blocking the accumulation of further message data at said terminal during said message transfer operation; and
   - release means at each said terminal responsive to said OK signal for disabling said lockout means.

4. The data transfer system set forth in claim 3, further comprising:
   - means responsive to said TEI signal for initiating a retransfer of said message.

5. The data transfer system set forth in claim 4, further comprising:
   - means included within said first error means for generating a BR signal upon detection of two successive unsuccessful message transfers from the same terminal; and
   - means at said transferring terminal responsive to said BR signal for providing an alarm indication at said terminal and for actuating said release means.

6. The data transfer system set forth in claim 3 wherein said transfer memory further comprises:
   - a gating circuit for each said message storage section for transmitting the outputs from said addressing circuit to said respective storage sections;

a sequentially advanceable selection circuit having an output connected to control each of said gating circuits, said selection circuit outputs being supplied in a mutually exclusive manner; and means connecting said first error means to said selection circuit whereby each said OK signal switches the output state thereof.

7. The data transfer system set forth in claim 1 further comprising:

error means for checking the accuracy of each message transfer from said transfer memory to said processing station, said error means generating a CHK signal upon completion of a successful transfer and a $\overline{CHK}$ signal upon detection of an unsuccessful transfer; and means responsive to said CHK signal for disabling said blocking means.

8. The data transfer system set forth in claim 7, further comprising:

means responsive to said $\overline{CHK}$ signal for initiating a retransfer of said message.

9. The data transfer system set forth in claim 8, further comprising:

means included within said error means for generating a TE2 signal upon detection of two successive unsuccessful message transfers from said transfer memory; and means responsive to said TE2 signal for providing an alarm indication and for disabling said blocking means.

10. The data transfer system set fort in claim 7 wherein said transfer memory further comprises:

a gating circuit for each said message storage section for transmitting the outputs from said addressing circuit to said respective storage sections;

a sequentially advanceable selection circuit having an output connected to control each of said gating circuits, said selection circuit outputs being supplied in a mutually exclusive manner; and means connecting said error means to said selection circuit whereby each said CHK signal switches the output state thereof.

11. In a data transfer system for channelling a message from any one of a plurality of message input terminals to a single-message processing station, the combination comprising:

a transfer memory;

means at each said input terminal for indicating when a complete message has been accumulated at said terminal;

means responsive to said last-mentioned means for connecting said terminal to said transfer memory and for transferring said message to said transfer memory;

means for transmitting a terminal identifying code with said message;

blocking means for inhibiting the further accumulation of message data at said connected terminal during said transfer operation;

means for disconnecting said terminal and disabling said blocking means upon completion of said transfer operation whereby said terminal is freed to accumulate further message data;

means operable subsequent to said last-mentioned means for transferring said message from said transfer memory to said processing station;

error means for checking the accuracy of said transfer from said transfer memory and for generating an alarm signal upon detection of an error; and means responsive to said alarm signal for enabling the indication of said error condition at the terminal identified by the identifying code accompanying said message.

* * * * *